(12) United States Patent
Numakami et al.

(10) Patent No.: US 7,548,950 B2
(45) Date of Patent: Jun. 16, 2009

(54) DATA-PROCESSING DEVICE, SYSTEM THEREOF, METHOD THEREOF, PROGRAM THEREOF, AND RECORDING MEDIUM STORING THE PROGRAM

(75) Inventors: Yukio Numakami, Tokorozawa (JP); Kenichiro Tada, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 995 days.

(21) Appl. No.: 10/890,481

(22) Filed: Jul. 14, 2004

(65) Prior Publication Data

US 2005/0028161 A1    Feb. 3, 2005

(30) Foreign Application Priority Data

Jul. 17, 2003    (JP)    ............... 2003-198555

(51) Int. Cl.
| | |
|---|---|
| G06F 15/16 | (2006.01) |
| G05B 23/02 | (2006.01) |
| H04N 5/91 | (2006.01) |
| H04N 7/00 | (2006.01) |

(52) U.S. Cl. ............ 709/204; 709/217; 340/3.31; 386/46; 348/460

(58) Field of Classification Search ............ None
See application file for complete search history.

(56) References Cited

U.S. PATENT DOCUMENTS

| | | | | |
|---|---|---|---|---|
| 6,131,111 | A * | 10/2000 | Yoshino et al. | ............ 709/204 |
| 6,344,878 | B1 * | 2/2002 | Emura | ............ 348/460 |
| 6,545,587 | B1 * | 4/2003 | Hatakeyama et al. | ...... 340/3.31 |
| 7,284,258 | B2 * | 10/2007 | Mineyama | ............ 725/58 |
| 2001/0046366 | A1 | 11/2001 | Susskind | ............ 386/46 |
| 2002/0137496 | A1 * | 9/2002 | Nagaoka et al. | ............ 455/414 |
| 2003/0093806 | A1 | 5/2003 | Dureau et al. | ............ 725/107 |
| 2003/0126612 | A1 | 7/2003 | Ikeda et al. | ............ 725/105 |

FOREIGN PATENT DOCUMENTS

| | | |
|---|---|---|
| EP | 0 939 549 A2 | 9/1999 |
| EP | 1 170 949 A1 | 1/2002 |
| JP | 2000-67488 | 3/2000 |

OTHER PUBLICATIONS

PTO-1449, References (4) and European Search Report dated Dec. 14, 2005.
Office Action issued for the corresponding European patent application No. 04254166.4 on Jul. 10, 2008.

* cited by examiner

*Primary Examiner*—Wen-Tai Lin
(74) *Attorney, Agent, or Firm*—Kratz, Quintos & Hanson, LLP

(57) ABSTRACT

A first data-recording device (400) includes a network interface, a recording unit, and a group recording reservation notifying unit. The network interface acquires a group recording reservation instruction containing a recording reservation data and requesting that a recording reservation be set. The recording unit sets the recording reservation in accordance with the recording reservation data contained in the group recording reservation instruction that the network interface has acquired. The group recording reservation notifying unit distributes data same as the recording reservation data, to a second data-recording device (401) or a third data-recording device (402) through a network (200).

19 Claims, 13 Drawing Sheets

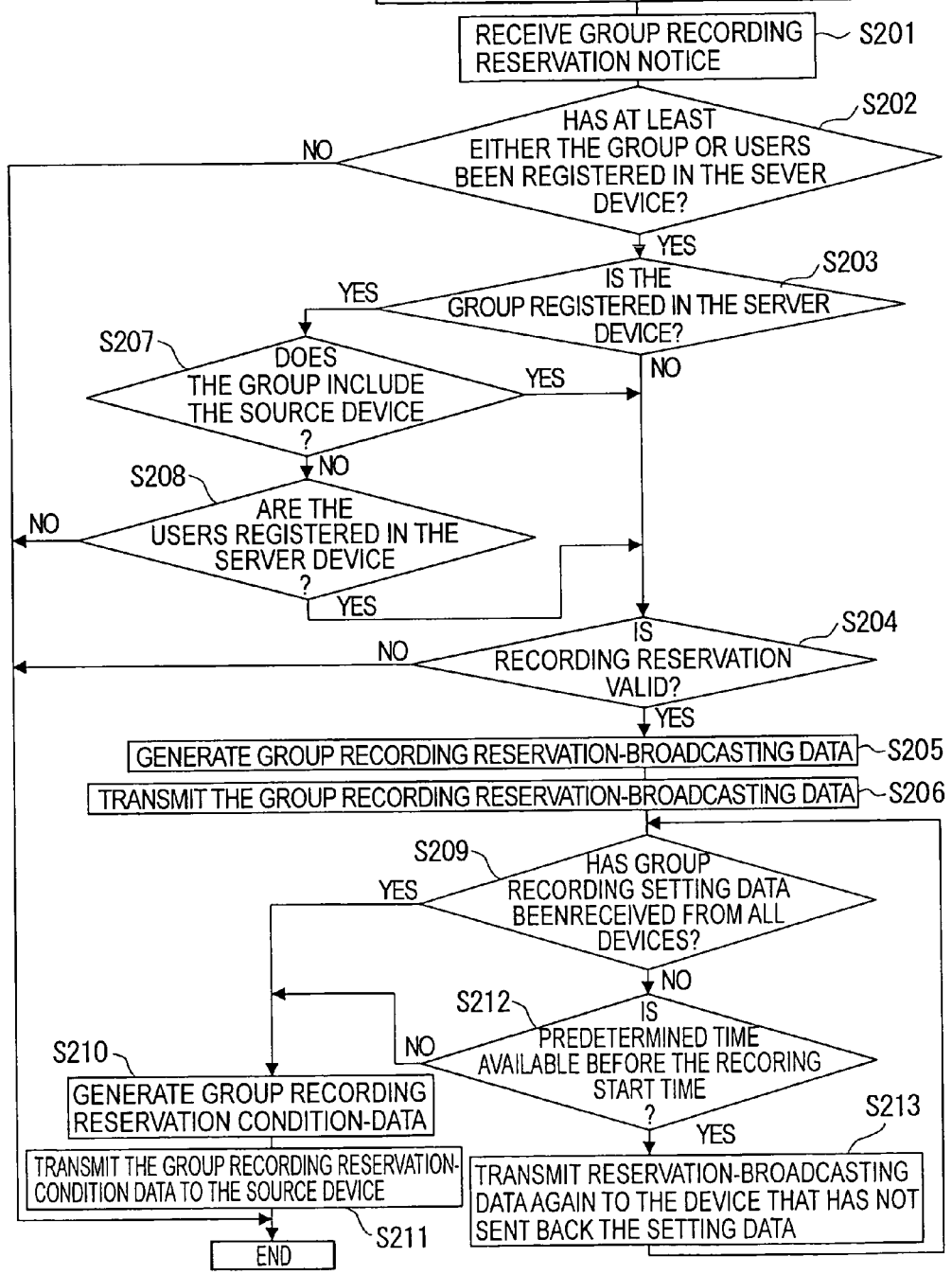

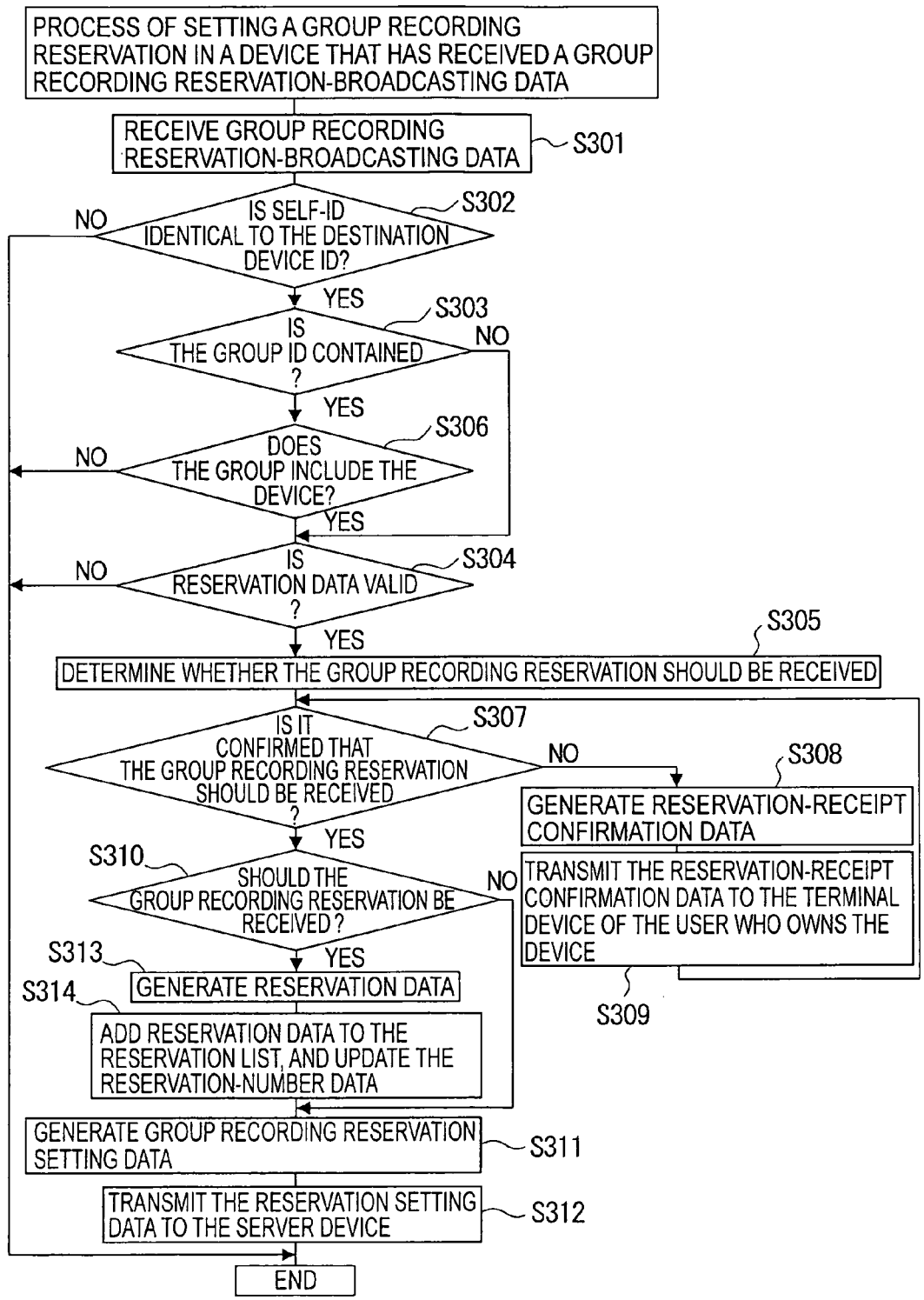

DATA-PROCESSING DEVICE, SYSTEM THEREOF, METHOD THEREOF, PROGRAM THEREOF, AND RECORDING MEDIUM STORING THE PROGRAM

BACKGROUND OF THE INVENTION

1. Field of the Invention

The present invention relates to a data-processing device that processes data in accordance with a request for the processing of the data, a system for processing data, a method of processing data, a program for processing data, and a recording medium storing the program.

2. Description of Related Art

Hitherto, data-recording devices such as video recorders and hard-disk recorders are known, which are so configured to record images transmitted on, for example, broadcast waves, and to be connected to networks. There are known systems that enable the user to automatically reserve recording in such a data-recording device set at home, at any place outside home by sending an E-mail or using a WEB site (see, for example, Jpn. Pat. Laid-Open Publication No. 2000-67488, page 3, left column to page 7, left column).

The recording reservation system disclosed in this publication includes a network, a terminal device, a data-recording device, and a server device. The terminal device, data-recording device and server device are connected to the network. The terminal device acquires program data from the server device via the network. The program data is indispensable to the reservation of recording. The terminal device transmits the TV-program data representing the TV program the user has selected, to the server device through the network. The server device transmits the TV-program data to the terminal device via the network. From the TV-program data, the server device generates a recording reservation instruction that causes the data-recording device to perform a recording reservation. The recording reservation instruction, thus generated, is transmitted via the network to the data-recording device. Upon receiving the recording reservation instruction, the data-recording device performs a recording reservation in accordance with the recording reservation instruction.

In the recording reservation system, the user makes a recording reservation for the data-recording device, by using the terminal device, as will be described below. First, the user operates the terminal device, thus acquiring the program data from the server device. Then, the user selects a TV program of which he or she wants to make a recording reservation. The TV-program data representing the TV program the user has selected is transmitted to the server device. The server device generates a recording reservation instruction from the TV-program data that it has received. The server device transmits the recording reservation instruction to the data-recording device. The data-recording device, which has received the recording reservation instruction, performs a process of setting the recording reservation.

Assume that a user has found a TV program that he or she wishes that his or her friend should enjoy by all unit, and that the friend has not reserved the recording of the TV program. In this case, the data-recording device in the friend's home cannot record this TV program in the system disclosed in the publication, unless the user can tell the friend to make the recording reservation. As a consequence, there arises a problem that the user's friend cannot enjoy seeing the TV program.

SUMMARY OF THE INVENTION

In view of the foregoing, an object of the present invention is to provide a data-processing device, a data-processing system, a data-processing method, a data-processing program and a recording medium storing the program, which can serve to process data in the same manner.

A data-processing device according to an aspect of the present invention includes: an instruction-acquiring unit which acquires process instruction data that contains request data requesting processing of data; a process control unit which processes the data in accordance with the request data contained in the process instruction data; and a data-distributing unit which distributes the request data.

A data-processing system according to an aspect of the present invention includes: a plurality of data-processing devices of the type described above; and a server device including request-acquiring unit connected to the data-processing devices by a network and configured to acquire the request data distributed from any one of the data-processing devices through the network, and a broadcasting unit configured to distribute the request data acquired by the request-acquiring unit, to any other data-processing devices. Each of the data-processing devices includes an instruction generator generates the process instruction and output the process instruction to the request-acquiring unit; the instruction-acquiring unit acquires the request data distributed from the server device; and the data-distributing unit causes the request-acquiring unit to acquire the request data.

The data-processing system according to the above aspect of the present invention includes a plurality of data-processing devices according to this invention, which are connected by a network to transmit and receive various data items. Each of the data-processing devices includes an instruction generator that generates a process instruction and outputs the process instruction to the instruction-acquiring unit of any other data-processing devices.

According to an aspect of the present invention, there is provided a data-processing method, in which an operation unit processes data in accordance with request data requesting that the data be processed. The operation unit acquires a process instruction containing the request data requesting that the data be processed, processes the data in accordance with the request data contained in the process instruction, and distributes the request data.

A data-processing program according to an aspect of the present invention makes an operating unit to perform the data-processing method described above.

A recording medium according to an aspect of the present invention stores a data-processing program of the type described above, such that the operating unit is able to read the data-processing program.

BRIEF DESCRIPTION OF THE DRAWINGS

FIG. 13 is a flowchart showing how the server device sets a group recording reservation in the embodiment; and FIG. 14 is a flowchart illustrating how each data-recording device sets a group recording reservation when the device receives a group recording reservation-broadcasting data in the embodiment.

DETAILED DESCRIPTION OF PREFERRED EMBODIMENTS

An embodiment of the present invention will be described, with reference to the accompanying drawings. The embodiment is exemplified as a recording reservation broadcasting system in which the recording reservation set in a data-recording device can set also in any other data-recording devices. The embodiment is not limited to this system, nevertheless. The recording reservation broadcasting system is designed to set the reservation of TV-program recording in the data-recording devices. Nonetheless, it may be a system that sets the reservation of radio-program recording in the data-recording devices. Further, it may be configured to process any data such as video data and programs in the same manner.

Figure 1:
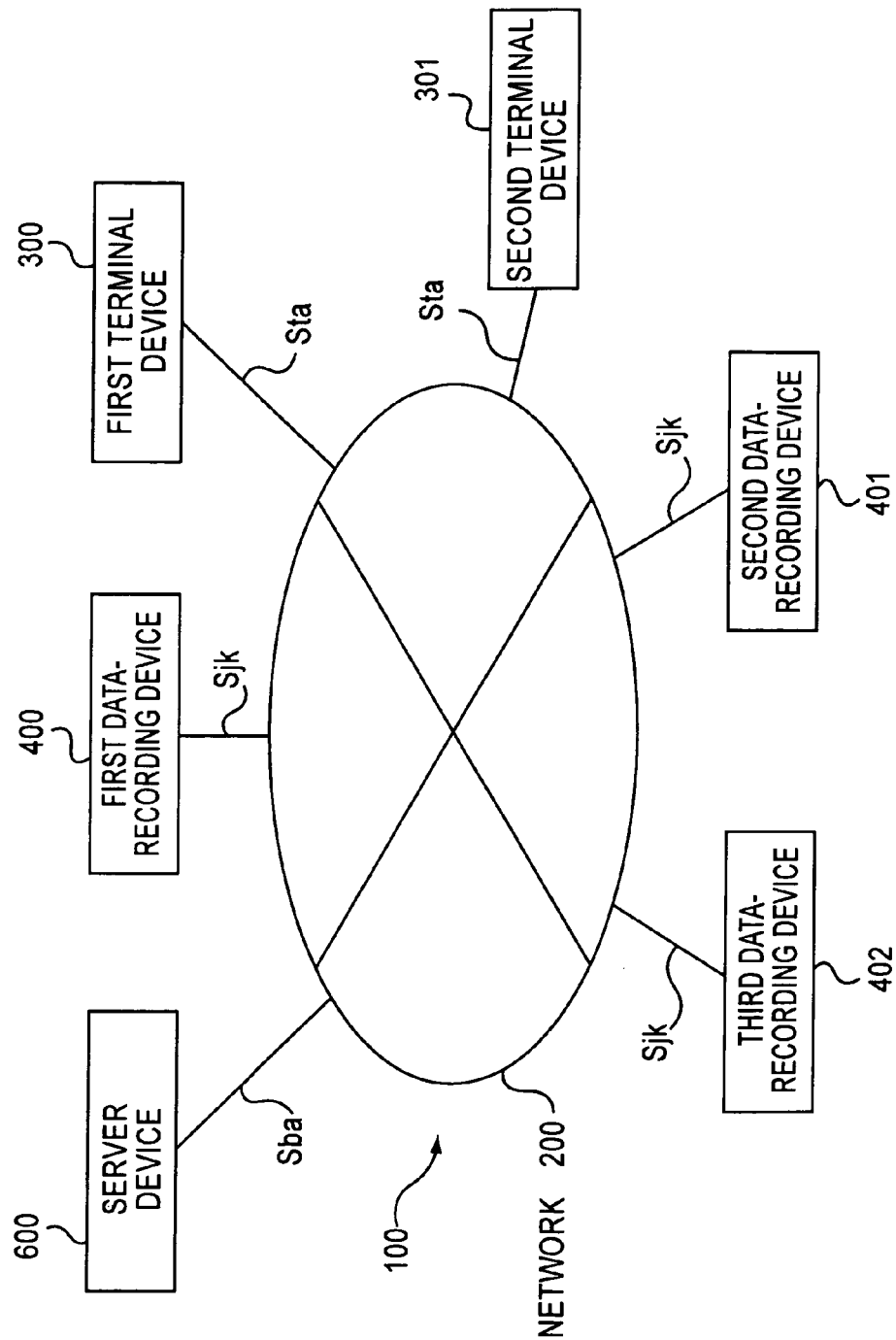
FIG. 1 is a block diagram showing a recording reservation broadcasting system according to an embodiment of the present invention.
Figure 2:
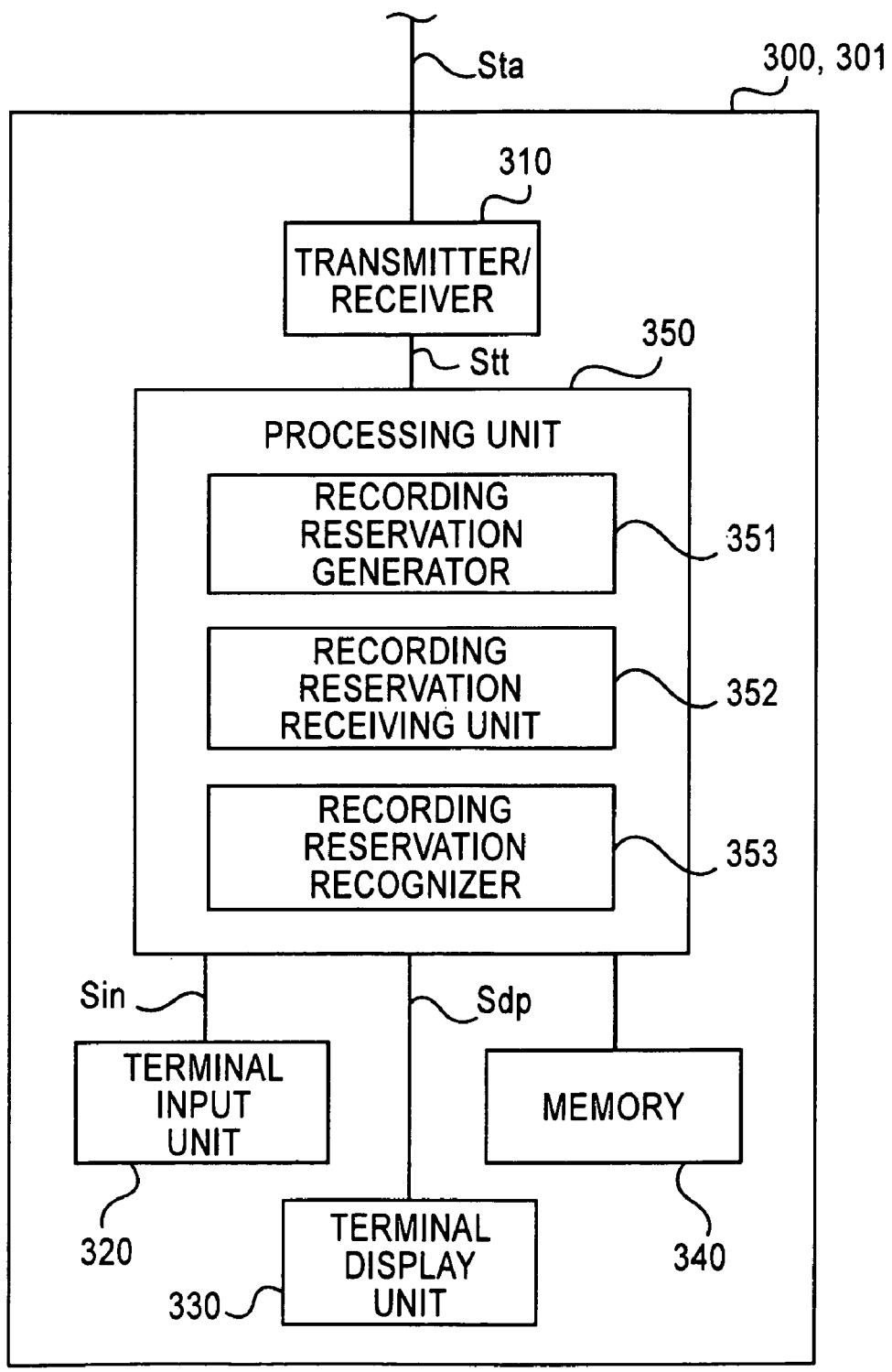
FIG. 2 is a block diagram depicting the configuration of one of the terminal devices in the embodiment.
Figure 3:
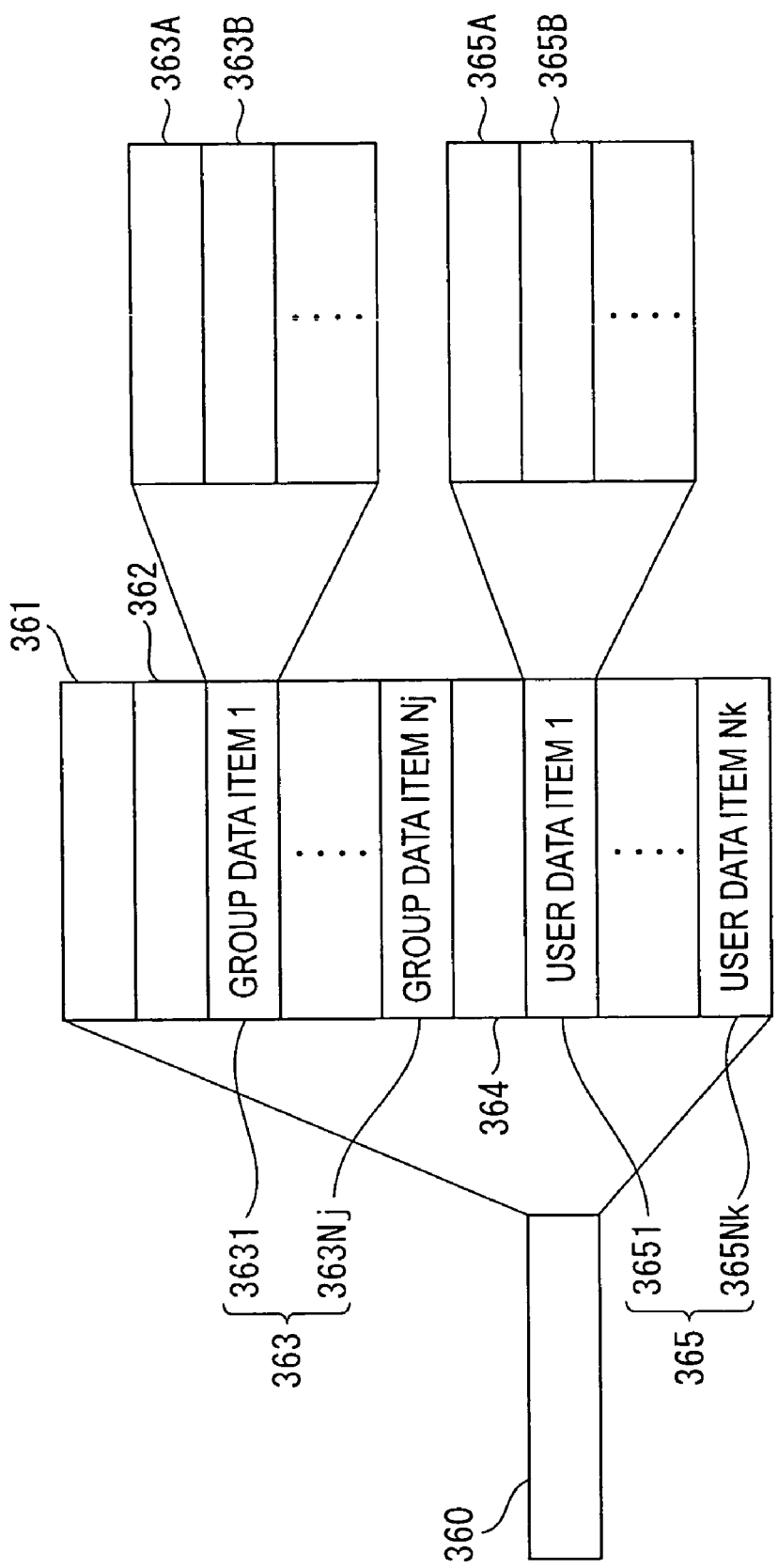
FIG. 3 is a schematic representation of various data items stored in a memory incorporated in each terminal device in the embodiment.
Figure 4:
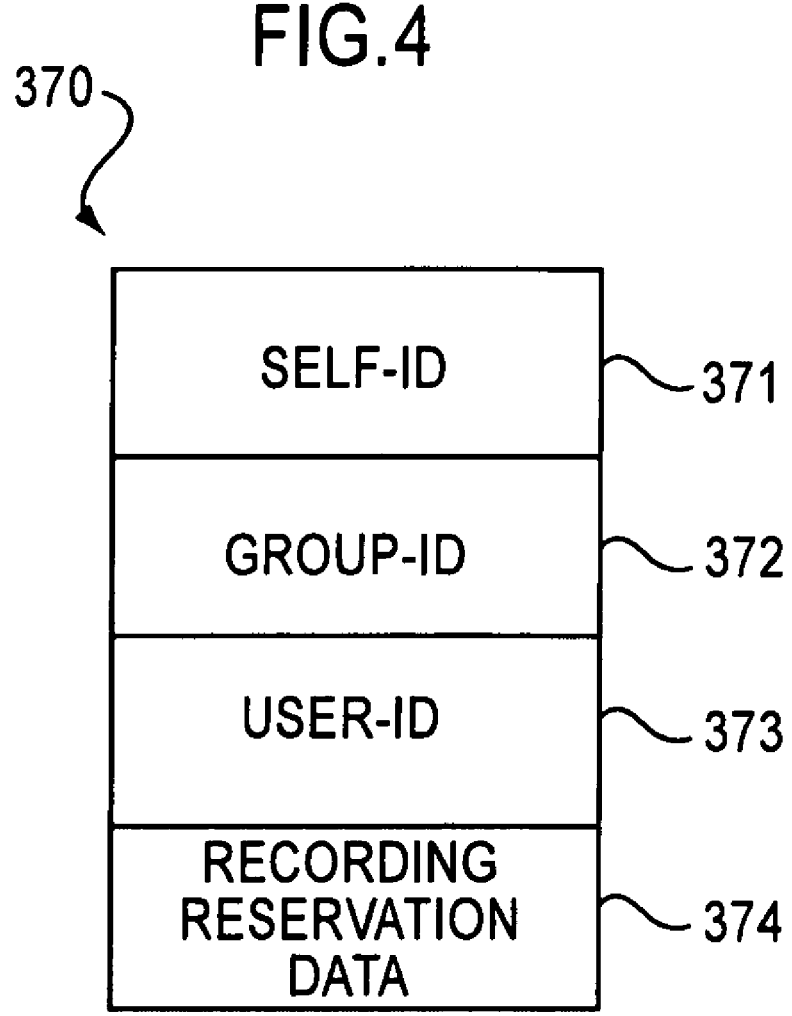
FIG. 4 is a diagram representing the format of the group recording reservation instruction in the embodiment.
Figure 5:
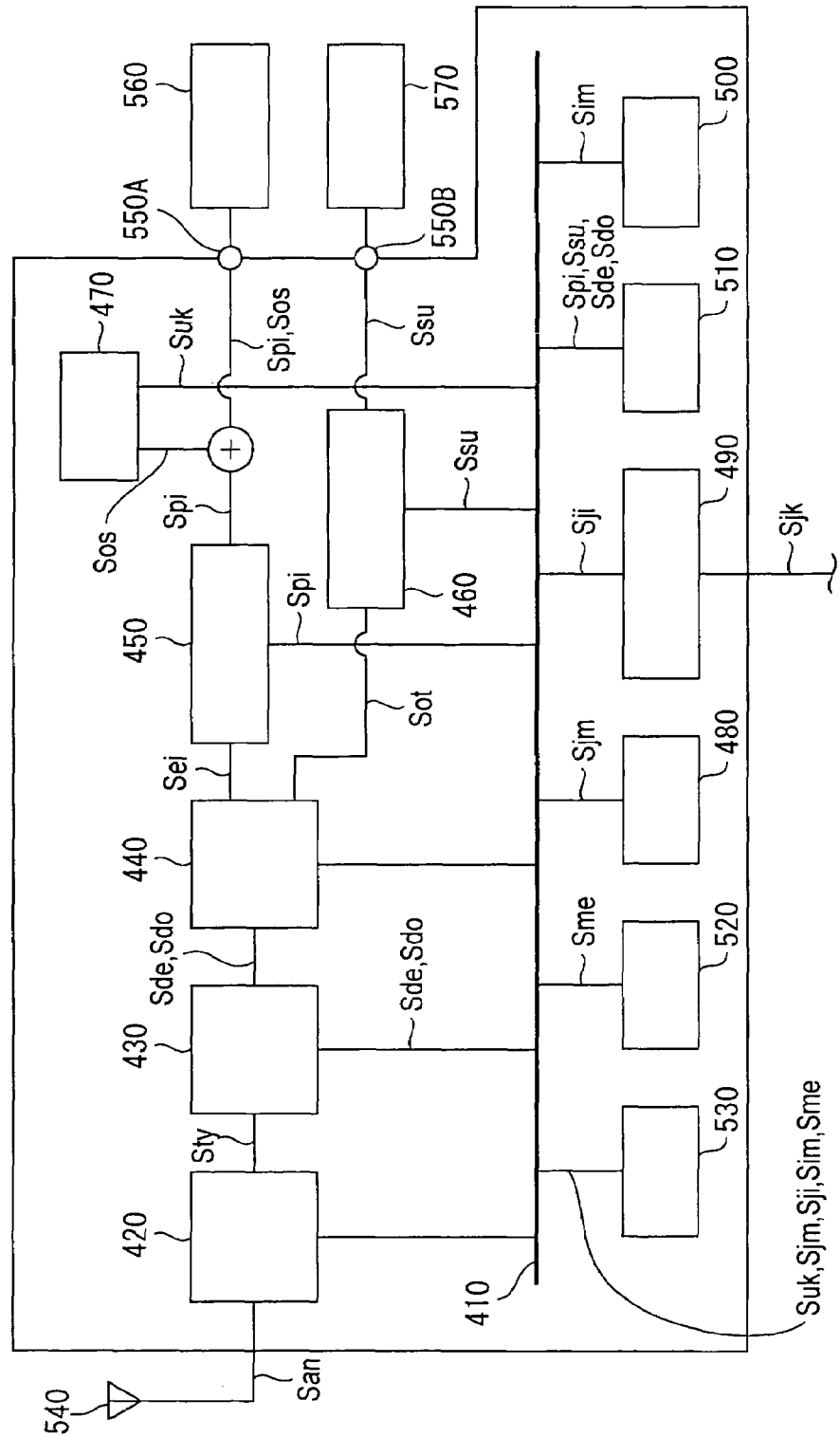
FIG. 5 is a block diagram showing the configuration of one of the data-recording devices in the embodiment.
Figure 6:
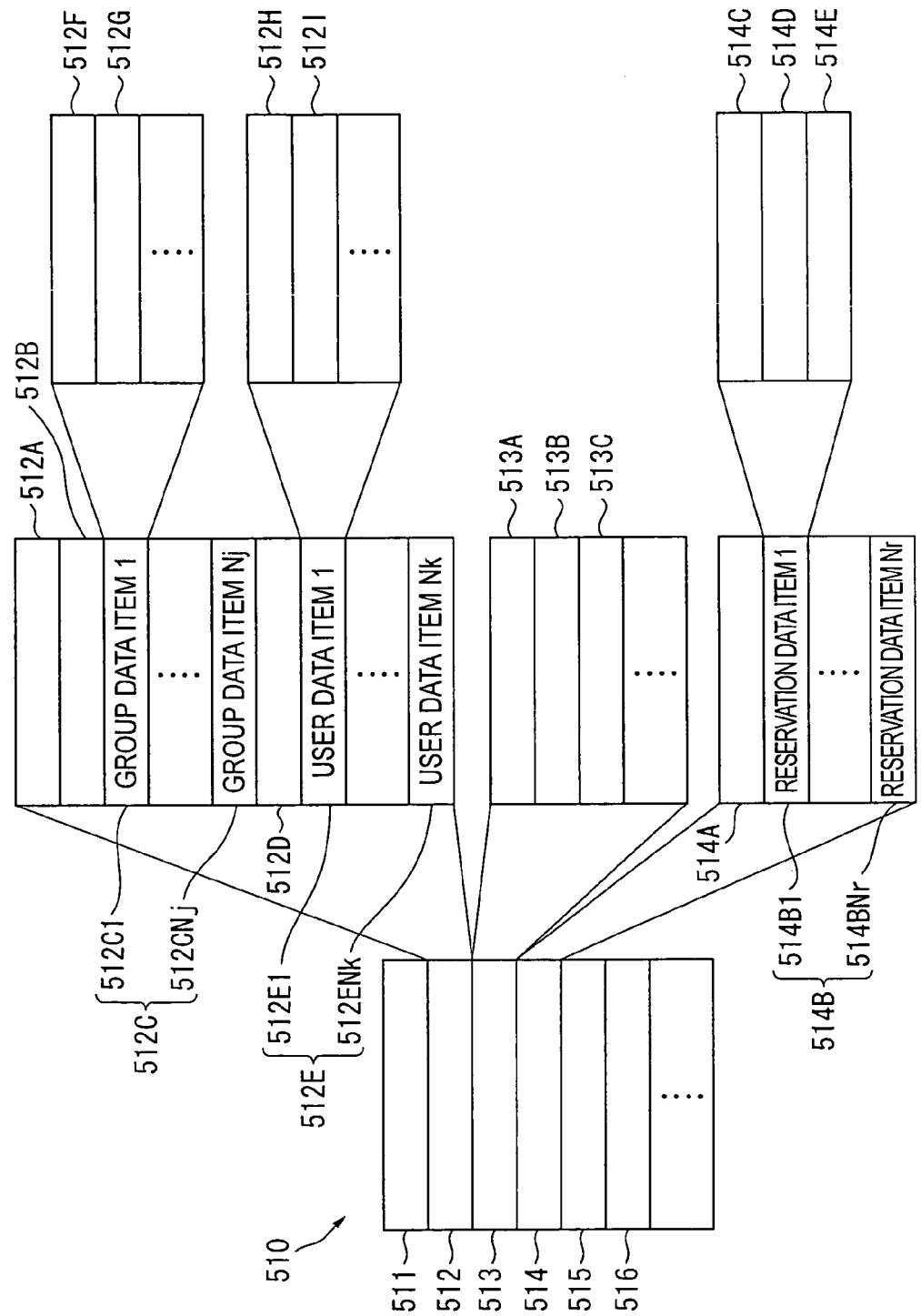
FIG. 6 schematically shows the various data items stored in a hard disk incorporated in each data-recording device in the embodiment.
Figure 7:
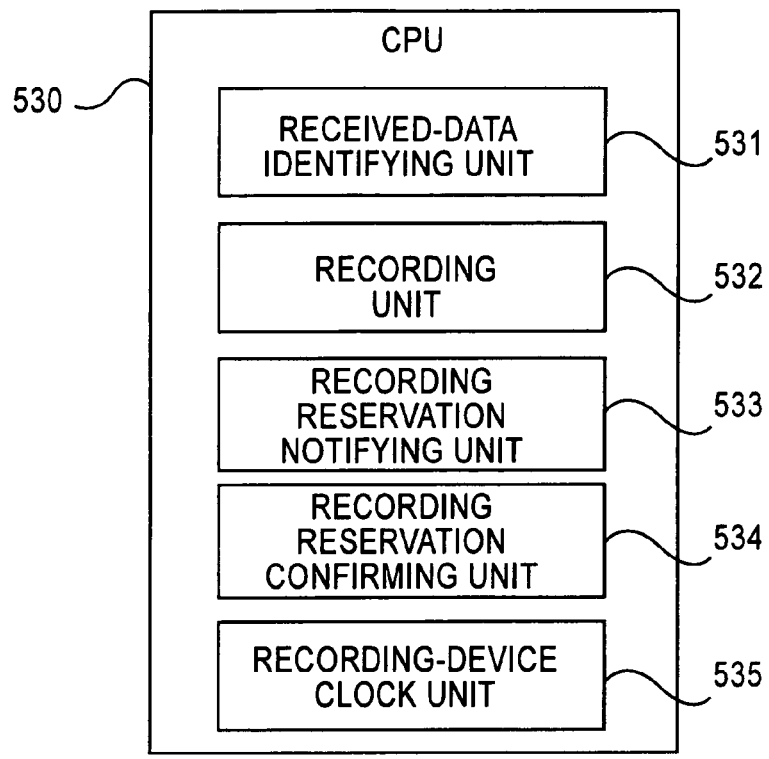
FIG. 7 is a block diagram showing the internal configuration of the CPU incorporated in each data-recording device in the embodiment.
Figure 8:
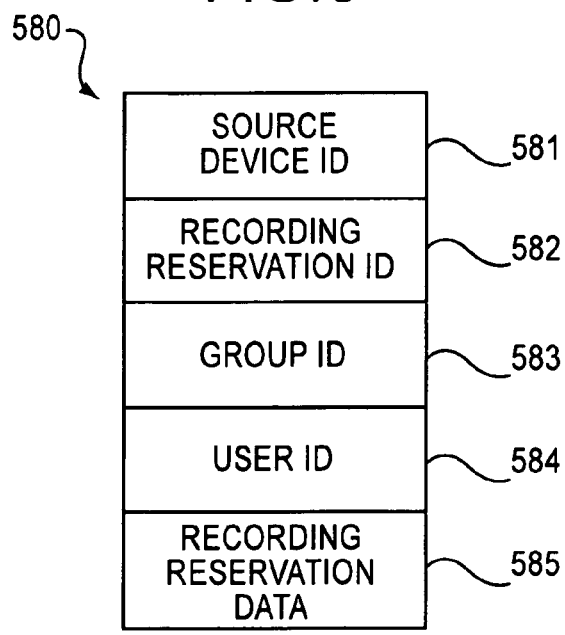
FIG. 8 is a schematic representation of the group recording reservation notice in the embodiment.
Figure 9:
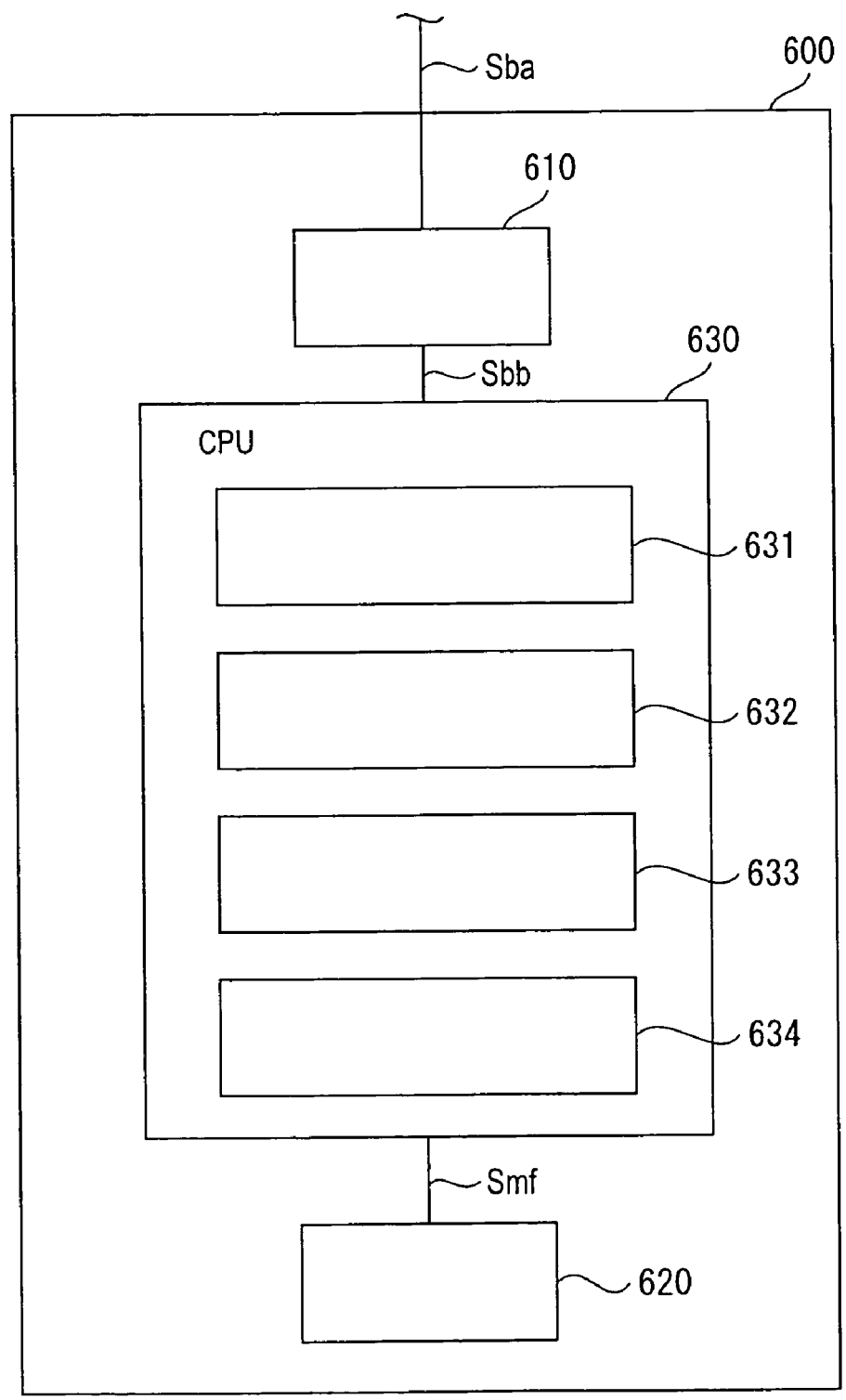
FIG. 9 is a block diagram illustrating the configuration of the server device in the embodiment.
Figure 10A:
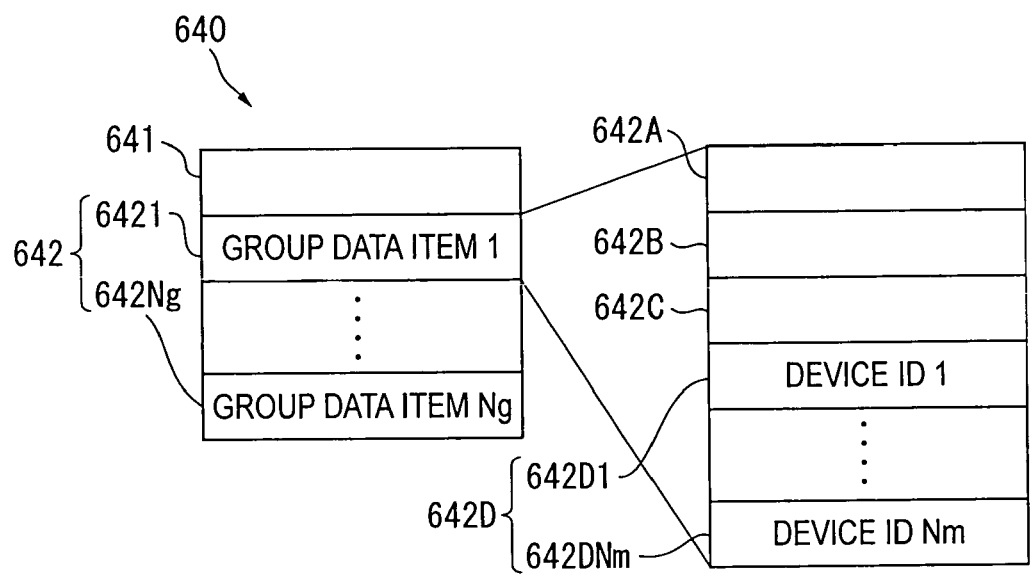
FIGS. 10A and 10B are a schematic representation of the various data items stored in a storage unit incorporated in the server device in the embodiment, FIG. 10A showing the group list and FIG. 10B depicting a user list.
Figure 10B:
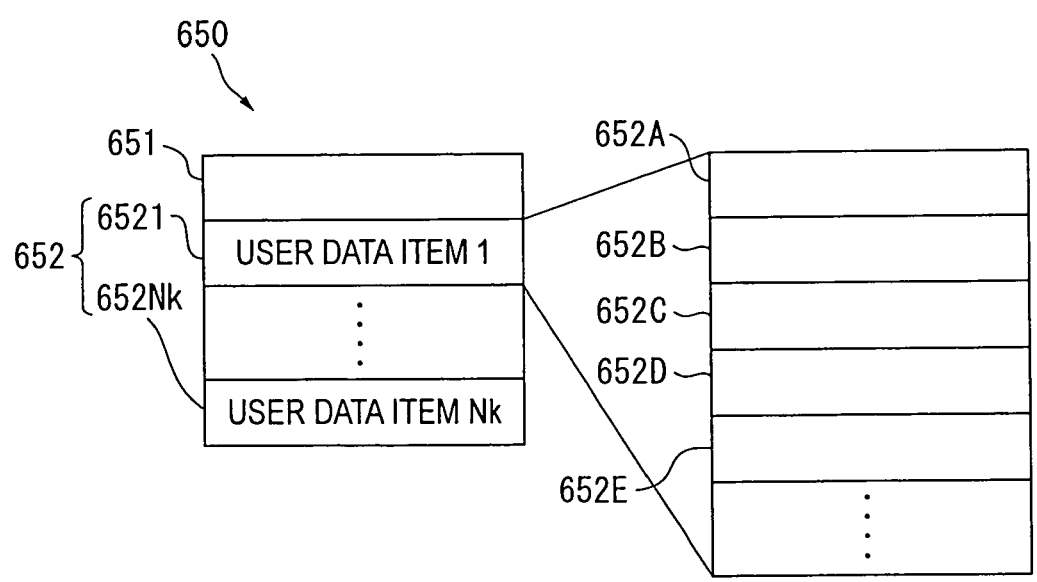
Figure 11:
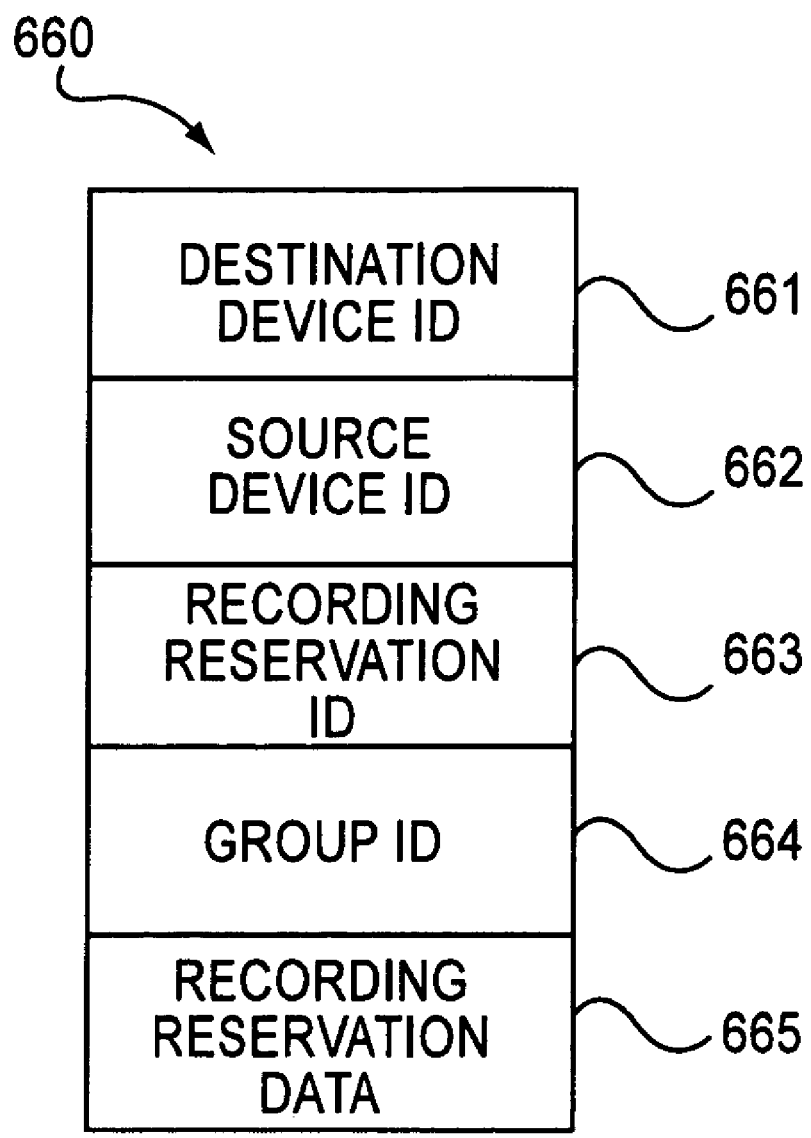
FIG. 11 is a schematic illustration of the group recording reservation-broadcasting data in the embodiment.

A process of setting a recording reservation in any data-recording device and setting the same reservation in any other data-recording devices will be described. This process shall be referred to as "group recording reservation." Also, a process of setting a recording reservation in one data-recording device only, which shall be called "ordinary recording reservation," will be described, too. FIG. 1 is a block diagram illustrating the recording reservation broadcasting system, in the embodiment of the present invention. FIG. 2 is a block diagram depicting the configuration of one of the terminal devices. FIG. 3 is a schematic representation of various data items stored in the memory incorporated in each terminal device. FIG. 4 is a diagram representing the format of the group recording reservation instruction. FIG. 5 is a block diagram showing the configuration of one of the data-recording devices. FIG. 6 schematically shows the various data items stored in the hard disk incorporated in each data-recording device. FIG. 7 depicts the internal configuration of the CPU incorporated in each data-recording device. FIG. 8 is a schematic representation of the group recording reservation notice. FIG. 9 is a block diagram illustrating the configuration of the server device. FIGS. 10A and 10B are a schematic representation of the various data items stored in the storage unit incorporated in the server device. More precisely, FIG. 10A shows the group list, and FIG. 10B depicts a user list. FIG. 11 is a schematic illustration of the group recording reservation-broadcasting data.

[Configuration of the Recording Reservation Broadcasting System]

FIG. 1 shows a recording reservation broadcasting system 100 that is a data-processing system. The recording reservation broadcasting system 100 has a network 200, a first terminal device 300 that functions as a terminal device and a process-instruction generating device, a second terminal device 301 that functions as a terminal device and a process-instruction generating device, a first data-recording device 400 that is used as a data-processing device in which a process should be performed, a second data-recording device 401 that is used as a data-processing device to which data should be transmitted, a third data-recording device 402 that is used as a data-processing device to which data should be transmitted, and a server device 600. The recording reservation broadcasting system 100 has three data-recording devices 400, 401 and 402. Instead, the broadcasting system 100 may have four or more data-recording devices, or may have, for example, only two data-recording devices 400 and 401.

As mentioned above, the recording reservation broadcasting system 100 is a system that accomplishes a group recording reservation. It will be described below how a recording reservation is set in the first data-recording device 400 and also in the second and third data-recording devices 401 and 402, both belonging to the same group as the first data-recording device 400. In this case, the first data-recording device 400 is regarded as a device that instructs a group recording reservation, and the second and third data-recording devices 401 and 402 are regarded as devices which are instructed to perform a group recording reservation. Nonetheless, the recording reservation set in, for example, the second data-recording device 401 may be set in the first and third data-recording devices 400 and 402. That is, the group recording reservation can be set in an interactive manner between the data-recording devices 400, 401 and 402.

The group to which the data-recording devices 400, 401 and 402 belong is registered in the recording reservation broadcasting system 100. Nevertheless, the data-recording devices 400, 401 and 402 can belong to different groups, too. To perform the group recording reservation in the recording reservation broadcasting system 100, a person who owns, for example, the second data-recording device 401 or the group to which the device 401 belongs can be selected if the device 401 is instructed to perform a group recording reservation.

To the network 200, there are connected the first terminal device 300, second terminal device 301, first data-recording device 400, second data-recording device 401, third data-recording device 402 and server device 600. That is, the network 200 connects the first terminal device 300, second terminal device 301, first data-recording device 400, second data-recording device 401, third data-recording device 402 and server device 600, so that they may transmit and receive data to and from one another. The network 200 may be, for example, an Intranet or an extranet that is based on a general-purpose protocol such as TCP/IP (Transmission Control Protocol/Internet Protocol), or may be a LAN (Local Area Network) based on Ethernet (TM). Instead, the network 200 may be a communications network or a broadcasting network that is constituted by a plurality of base stations that can transmit and receive data by radio. Otherwise, the network may employ radio media that convey data, directly to and from the first terminal device 300, second terminal device 301, first data-recording device 400, second data-recording device 401, third data-recording device 402 and the server device 600. The radio media are, for example, electric waves, light beams, sound waves or electromagnetic waves.

The first terminal device 300 and the second terminal device 301 are, for example, PDAs (Personal Digital Assistants), mobile telephones, PHSs (Personal Handyphone Systems), portable personal computers, remote controllers, or the like. The first terminal device 300 and the second terminal device 301 are almost identical in configuration. Thus, the first terminal device 300 will be first described. The second terminal device 301 will be later described, for the features different from the first terminal device 300.

The first terminal device 300 can transmit and receive various data items to and from the first data-recording device 400 through the network 200. The first terminal device 300 can set an ordinary recording reservation or a group recording reservation in the first data-recording device 400 and performs other processes. As FIG. 2 shows, the first terminal device 300 has a transmitter/receiver 310, a terminal input unit 320, a terminal display unit 330, a memory 340, and a processing unit 350. The transmitter/receiver 310 functions not only as unit for acquiring terminal-setting data, but also as unit for outputting a terminal signal. The terminal input unit 320 is used as unit for inputting terminal signals. The terminal display unit 330 is used as a terminal display for displaying information. The processing unit 350 is a unit for outputting a terminal signal.

The transmitter/receiver 310 is connected by the network 200 to the first data-recording device 400 and the server device 600. The transmitter/receiver 310 is connected to the processing unit 350, too. The transmitter/receiver 310 can receive a terminal signal Sta from the first data-recording device 400 or the server device 600 through the network 200. Upon acquiring the terminal signal Sta, the transmitter/receiver 310 performs a preset input-interface process, outputting a process-terminal signal Stt to the processing unit 350. The transmitter/receiver 310 performs a preset output-interface process, too, upon acquiring the process-terminal signal Stt, thus outputting a terminal signal Sta. This terminal signal Sta is transmitted to the first data-recording device 400 or the server device 600 through the network 200.

The terminal input unit 320 is, for example, a keyboard or a mouse. It has various operation buttons (not shown) that are operated to input data. The operation buttons are operated to update group-related data 360 stored in the memory 340, which will be described later, to select the group recording reservation or the ordinary recording reservation, and to set the terminal device 300 so that it may receive or not receive a group recording reservation from any data-recording device (e.g., device 401) other than the first data-recording device 400. As the terminal input unit 320 inputs a prescribed data item, the unit 320 outputs a specific process signal Sin to the processing unit 350. The terminal input unit 320 is not limited to one that has buttons. The input unit 320 may be a touch panel, which may be provided on, for example, the terminal display unit 330. Alternatively, the unit 320 may be one that inputs and sets various data items given in the form of speeches.

The terminal display unit 330 is, for example, a liquid crystal display, an organic EL (Electroluminescence) panel, a PDP (Plasma Display Panel), a CRT (Cathode-Ray Tube), or the like. The terminal display unit 330 receives a signal Sdp processed by the processing unit 350 and supplied from the processing unit 350. The terminal display unit 330 displays the video data that is described in the processed signal Sdp. The video data is, for example, a menu that prompt the user to operate the terminal input unit 320, thereby to input and set various data items.

The memory 340 stores such group-related data 360 as shown in FIG. 3, which can be read whenever necessary. The memory 340 stores various programs that work on the OS (Operating System), which controls the first terminal device 300 as a whole. The memory 340 may have a drive or a driver that stores data in a recording medium such as an HD (Hard Disc) or an optical disc.

The group-related data 360 is the data that is used to set a group recording reservation. The group-related data 360 is a table composed of a self-ID (identification) 361, group-number data 362, group data 363, registered-user number data 364, registered-user data 365, and the like.

The self-ID 361 is, for example, the ID number that identifies the first data-recording device 400.

The group-number data 362 is data representing the serial number of the group to which the first data-recording device 400 belongs.

The group data 363 is a table composed of group data items 3631 to 363Nj (Nj is a natural number) pertaining to the group to which the first data-recording device 400 belongs. Each of the group data items 3631 to 363Nj contains an ID data item, such as a number or a group name, which identifies the group. Each group data item is a table, too, which consists of a group ID 363A, an additional group data item 363B, and the like. The group ID 363A is, for example, a unique group ID number, and the additional group data item 363B is, for example, the group name.

The registered-user number data 364 is data about the number of the users registered in the group-related data 360.

The registered-user data 365 is a table of user data items 3651 to 365Nk (Nk is a natural number). Each of the user data items 3651 to 365Nk represents the number and name of a user registered. Each user data item is a table, too, which is composed of user ID 365A, an additional user data item 365B, and the like. The user ID 365A is a user ID number. The additional user data item 365B is the name of the user.

The processing unit 350 has various input and output ports (not shown). Among these input and output ports is a communications port to which the transmitter/receiver 310, for example, is connected, a key input port to which the terminal input unit 320 is connected, a display control port to which the terminal display unit 330 is connected, and a memory port to which the memory 340 is connected. As FIG. 2 shows, the processing unit 350 has a recording reservation generator 351, a recording reservation receiving unit 352, a recording reservation recognizer 353, and the like. Although not detailed here, the processing unit 350 has a function of setting an ordinary recording reservation.

The recording reservation generator 351 generates such group recording reservation instruction 370 as is illustrated in FIG. 4. The reservation instruction 370 is required in setting a group recording reservation in the data-recording device 400, 401 and 402 that are registered in the recording reservation broadcasting system 100. The recording reservation generator 351 transmits the group recording reservation instruction 370 to the first data-recording device 400 through the network 200. More specifically, the recording reservation generator 351 generates the group recording reservation instruction 370 when the reservation generator 351 determines, from the process signal Sin input from the terminal input unit 320, that the group recording reservation described in the process signal Sin should be set. How the recording reservation generator 351 generates the group recording reservation instruction 370 will be explained later. The group recording reservation instruction 370, thus generated, is converted to a process-terminal signal Stt, if necessary. The process-terminal signal Stt is output to the transmitter/receiver 310.

The group recording reservation instruction 370 is a table composed of a self-ID 371, a group ID 372, a user ID 373, a recording reservation data 374, and the like. The self-ID 371 identifies the device in which data should be processed. The group ID 372 identifies a device to which data should be transmitted. The user ID 373 identifies a person to whom data should be transmitted. The recording reservation data 374 is a request for a recording reservation. In some cases, either the group ID 372 or the user ID 373 may not be contained in the group recording reservation instruction 370.

The self-ID 371 is, for example, the device ID number designating the first data-recording device 400 that instructs the group recording reservation.

The group ID 372, which identifies the group of device in which the recording reservation should be made, is a group ID number or the like. In some cases, the group ID 372 may be a table of group ID numbers.

The user ID 373 is a user ID number used as, for example, destination data that identifies the user who uses the data-recording device (e.g., second data-recording device 401) other than the first data-recording device 400 that makes the group recording reservation. In some cases, the user ID 373 may be a table of group ID numbers.

The recording reservation data 374 is a table composed of basic data items required to make a recording reservation, such as the date, the time data including recording-start time and recording-end time, the channel number, and the like. Hereinafter, these basic data items, which are required to make a recording reservation, will be referred to as "recording basic information."

The recording reservation receiving unit 352 determines whether a group recording reservation should be received from a data-recording device (e.g., second data-recording device 401) other than the first data-recording device 400. Then, the unit 352 generates reservation-receipt setting data that shows what it has determined. The reservation-receipt setting data is transmitted to the first data-recording device 400 via the network 200. More precisely, the recording reservation receiving unit 352 recognizes the reservation-receipt conformation data described, as setting-request data, in a process-terminal signal Stt output from the transmitter/receiver 310. The reservation-receipt conformation data describes a request prompting the user to receive or refuse the group recording reservation made by, for example, the second data-recording device 401. The unit 352 converts the recognized reservation-receipt conformation data, into a process signal Sdp, which is output to the terminal display unit 330. Thereafter, the unit 352 recognizes the reservation-receipt setting data described in the process signal Sin input from the terminal input unit 320. The unit 352 then converts the reservation-receipt setting data into a process-terminal signal Stt, which is output to the transmitter/receiver 310.

The recording reservation recognizer 353 recognizes the recording reservation that has been set in, for example, the second data-recording device 401 in accordance with the group recording reservation transmitted from the first data-recording device 400. To be more specific, the recording reservation recognizer 353 recognizes the group recording reservation-condition data (not shown) described in the process-terminal signal Stt transmitted from the transmitter/receiver 310. The group recording reservation-condition data describes the data showing whether or not the second data-recording device 401 should receive the group recording reservation from the first data-recording device 400. The recognizer 353 converts the group recording reservation-condition data that it has recognized, into a process signal Sdp. The process signal Sdp is output to the terminal display unit 330.

The second terminal device 301 will be described. The second terminal device 301 is connected to transmit and receive various data items to and from the second data-recording device 401 through the network 200. The second terminal device 301 sets an ordinary recording reservation or a group recording reservation in the second data-recording device 401.

The first data-recording device 400, second data-recording device 401 and third data-recording device 402 can be, for example, hard disk recorders or DVDs (Digital Versatile Disk) recorders incorporating a hard disk, or the like. The first data-recording device 400, second data-recording device 401 and third data-recording device 402 are identical in configuration. Thus, only the first data-recording device 400 will be described below.

The first data-recording device 400 can record and playback TV programs when the first terminal device 300 is operated and inputs data. When the first terminal device 300 is operated, setting a group recording reservation, the device 400 generates a signal for causing the second data-recording device 401 and the third data-recording device 402 to set the group recording reservation. This signal is transmitted to the server device 600. As illustrated in FIG. 5, the first data-recording device 400 has a bus 410, a tuner 420, a demultiplexer 430, a decoder 440, a video compositor 450, an audio compositor 460, an OSD (On Screen Display) 470, a remote-control light-receiving unit 480, a network interface 490, an input unit 500, a hard disk 510, a memory 520, a CPU and the like. The network interface 490 works as an instruction acquiring unit. The input unit 500 functions as signal output unit. The hard disk 510 functions as a recording medium and a unit for storing processing device. Note that the input unit 500 and the CPU 530 constitute an instruction generator according to the present invention.

The bus 410 is, for example, a PCI (Peripheral Component Interconnect) bus, an IEEE (Institute of Electrical and Electronic Engineers) 1394 bus, or the like. To this bus 410, there are connected the tuner 420, demultiplexer 430, decoder 440, video compositor 450, audio compositor 460, OSD 470, remote-control light-receiving unit 480, network interface 490, hard disk 510, input unit 500, memory 520, CPU 530 and the like.

An antenna 540 for receiving broadcast waves is connected to the tuner 420. The tuner 420 is connected to the demultiplexer 430. The tuner 420 is connected to the CPU 530, too, by the bus 410. When controlled by the CPU 530, the tuner 420 acquires the signal San that the antenna 540 has received and input to the first data-recording device 400. The tuner 420 converts the acquired signal San to a process signal Sty, which is output to the demultiplexer 430.

The demultiplexer 430 is connected to the decoder 440. The demultiplexer 430 is also connected to the hard disk 510 by the bus 410. The demultiplexer 430 is also connected to the CPU 530 by the bus 410. When controlled by the CPU 530, the demultiplexer 430 acquires the process signal Sty input from the tuner 420. The demultiplexer 430 separates video data and audio data from each other, which are described in the process signal Sty. The demultiplexer 430 converts the video data into a process signal Sde, which is output to the decoder 440 and the hard disk 510. The demultiplexer 430 converts the audio data into a process signal Sdo, which is output to the decoder 440 and the hard disk 510.

The decoder 440 is connected to the video compositor 450. The decoder 440 is connected to the audio compositor 460, too. Further, the decoder 440 is connected to the CPU 530 by tbe bus 410. When controlled by the CPU 530, the decoder 440 acquires the video data described in the process signal Sde that has been input from the demultiplexer 430. The decoder 440 restores the video data to a video-data stream and converts the data stream into a process signal Sei. The process signal Sei is output to the video compositor 450. Moreover, the decoder 440 acquires the audio data described in the process signal Sdo input from the demultiplexer 430, under the control of the CPU 530. The decoder 440 restores the audio data to an audio-data stream and converts the audio-data stream into a process signal Sot. The signal Sot is output to the audio compositor 460.

The video compositor 450 is connected to a display unit 560 which is connected to a terminal unit 550A and which functions as a process-device notifying unit. The video compositor 450 is also connected to the CPU 530 by the bus 410. When controlled by the CPU 530, the video compositor 450 converts the process signal Sei input from the decoder 440, to a video signal Spi. The video signal Spi is output to the display unit 560 that is connected to a terminal unit 550. The display unit 560 displays the video-data stream. The video compositor 450 is also connected to the hard disk 510 by the bus 410. To record a TV program in the first data-recording device 400, the video compositor 450 outputs the video signal Spi to the display unit 560 and the hard disk 510 under the control of the CPU 530. To record the video-data stream in the first data-recording device 400, the demultiplexer 430 outputs the process signal Sde in which the video data is described to the hard disk 510.

The audio compositor 460 is connected to an audio-data output unit 570 that is connected to a terminal unit 550B. The audio compositor 460 is also connected to the CPU 530 by the bus 410. When controlled by the CPU 530, the audio compositor 460 converts the process signal Sot input from the decoder 440, to an audio signal Ssu. The audio signal Ssu is output to the audio-data output unit 570 connected to the terminal unit 550B. The audio-data output unit 570 outputs the audio-data stream. The audio compositor 460 is also connected to the hard disk 510 by the bust 410. To record a TV program in the first data-recording device 400, the audio compositor 460 outputs the audio signal Ssu to the audio-data output unit 570 and the hard disk 510, under the control of the CPU 530. To record the audio-data stream in the first data-recording device 400, the demultiplexer 430 outputs the process signal Sdo describing audio data, to the hard disk 510.

The OSD 470 is connected to the display unit 560. The OSD 470 is also connected to the CPU 530 by the bus 410. When controlled by the CPU 530, the OSD 470 acquires the data input from the CPU 530, which represents the adjusted state and operating state of the display unit 560, and a process signal Suk which describes the data prompting the input if the data showing whether or not the second data-recording device 401 should receive the group recording reservation. The OSD 470 converts the various data items described in the process signal Suk, to an OSD signal Sos. The OSD signal Sos is output to the display unit 560. The display unit 560 displays the data and image, superimposed on the video-data stream displayed in accordance with the video signal Spi supplied from the video compositor 450.

The remote-control light-receiving unit 480 is connected to the CPU 530 by the bus 410. The remote-control light-receiving unit 480 receives, for example, the infrared ray emitted from a remote controller (not shown) that can generate an instruction for setting the ordinary recording reservation and an instruction for setting group recording reservation. The unit 480 converts the signal contained in the infrared ray, to a process signal Sjm. The process signal Sjm is output to the CPU 530.

The network interface 490 is connected to the first terminal device 300 and the server device 600 by the network 200. The network interface 490 is also connected to the CPU 530 by the bus 410. The network interface 490 receives a recording-device signal Sjk input via the network 200 from the first terminal device 300 or the server device 600. Upon acquiring the recording-device signal Sjk, the network interface 490 carries out a preset input-interface process, generating a process-recording device signal Sji. The signal Sji is output to the CPU 530. Upon acquiring the process-recording device signal Sji from the CPU 530, the network interface 490 performs a present output-interface process, generating a recording-device signal Sjk. This signal Sjk is transmitted via the network 200 to the first terminal device 300 or the server device 600.

The input unit 500 is composed of various operation buttons that are arranged on, for example, the front of the first data-recording device 400. These buttons are operated to cause the display unit 560 to display images sequentially at high speed or display images in the reverse order, to generate the ordinary recording reservation data, and to generate the group recording reservation instruction 370, i.e., the data showing whether or not the group recording reservation should be received from, for example, the second data-recording device 401. The input unit 500 is connected to the CPU 530 by the bus 410. When operated, the input unit 500 outputs a prescribed process signal Sim to the CPU 530. The input unit 500 is not limited to operation buttons. It may be a touch panel, which may be provided on, for example, the display unit 560. Alternatively, it may be one that inputs and sets various data items given in the form of speeches.

The hard disk 510 is connected to the memory 520 and the CPU 530 by the bus 410. As FIG. 6 shows, the hard disk 510 stores device-management data 511, group-related data 512, user-management data 513, a recording reservation list 514, a content list 515, contents 516, and the like.

The device-management data 511 is data about the first data-recording device 400, representing, for example, the model number of the device 400.

The group-related data 512 is used to set the group recording reservation. The group-related data 512 is updated when the first terminal device 300, the input unit 500, the remote controller or the like is operated to set the group recording reservation. Like the group-related data 360 stored in the memory 340 of the first terminal device 300, the group-related data 512 is a table composed of a self-ID (identification) 512A, group-number data 512B, group data 512C, registered-user number data 512D, registered-user data 512E, and the like.

The group data 512C is a table composed of group data items 512C1 to 512CNj (Nj is a natural number) pertaining to the group to which the first data-recording device 400 belongs. Each of the group data items 512C1 to 512CNj is a table, too, which consists of a group ID 512F similar to the group ID 363A, an additional group data item 512G similar to the additional group data item 363B, and the like.

The registered-user data 512E is a table of user data items 512E1 to 512ENr (Nr is a natural number), which correspond to the users. Each of the user data items 512E1 to 512ENr is a table, too, which is composed of a user ID 512H similar to the user ID 365A, an additional user data item 512I similar to the additional user data item 365B, and the like.

The user-management data 513 is data about the user who owns the first data-recording device 400. The user-management data 513 is updated when the first terminal device 300, the input unit 500, the remote controller or the like is operated to set the group recording reservation. The user-management data 513 is a table composed of a mail address 513A, a telephone number 513B, a user ID 513C, and the like.

The recording reservation list 514 is data about the ordinary recording reservation or the group recording reservation set for the first data-recording device 400. The recording reservation list 514 is a table composed of reservation-number data 514A, reservation data 514B, and the like.

The reservation-number data 514A is the data representing the number of the reservations that have been set for the first data-recording device 400. The number of recording reservations, which is represented by the reservation-number data 514A, increases every time an ordinary recording reservation or a group recording reservation is set. It decreases every time the recording set by the reservation is completed.

The reservation data 514B is a table of reservation data items 514B1 to 514BNr (Nr is a natural number), which are concerned with recording reservations. The reservation data items 514B1 to 514BNr are added to the recording reservation list 514 when the ordinary recording reservation or the group recording reservation is set. They are deleted from the recording reservation list 514 when the recording set by the reservation is completed. Each of the reservation data items 514B1 to 514BNr is a table, too, which is composed of a recording reservation ID 514C, a group ID 514D, recording reservation data 514E, and the like.

The recording reservation ID 514C is, for example, a recording reservation ID number that is added to the ordinary or group recording reservation when this reservation is set. When the recording set by the reservation is completed, the recording reservation ID is added to the content list 515, as content ID for the contents recorded.

The group ID 514D is, for example, a group ID number that identifies the group for which the group recording reservation is set. To set the ordinary recording reservation, the group ID 514D is not added to the reservation data 514BNr.

The recording reservation data 514E is a table of the recording basic data items such as the recording date, recording start time, recording end time, and channel number.

The content list 515 is a table composed of the titles, IDs, lengths, recording dates and times, and the like of the contents 516 stored in the hard disk 510.

The contents 516 are the video data, audio data and the like of the TV programs or the like that the antenna 540 has received. The video data included in the contents 516 is the video-data stream described in the video signal Spi input from the video compositor 450, or the video data described in the process signal Sde input from the demultiplexer 430. The audio data is the audio-data stream described in the audio signal Ssu input from the audio compositor 460, or the audio data described in the process signal Sdo input from the demultiplexer 430.

The memory 520 is connected to the CPU 530 by the bus 410. The memory 520 stores the group recording reservation instruction 370 input from the CPU 530, group recording reservation broadcasting data 660 that will be described later, and various data. These items of data can be read from the memory 520, whenever necessary. The memory 520 stores various programs that work on the OS (Operating System), which controls the first data-recording device 400 as a whole.

As FIG. 7 shows, the CPU 530 has a received-data identifying unit 531, a recording unit 532, a recording reservation notifying unit 533, a recording reservation confirming unit 534, and a recording-device clock unit 535, all provided in the form of various programs. The received-data identifying unit 531 is a data-distribution control unit that functions as a process control unit, too. The recording unit 532 works as a process control unit. The recording reservation notifying unit 533 is used as a data-distribution unit and a broadcasting-notice generator. The recording reservation confirming unit 534 works as a request-receipt confirming unit and a set-request generator. The recording-device clock unit 535 functions as process-device timer.

The received-data identifying unit 531 determines whether a group recording reservation can be normally performed, from the group recording reservation instruction 370 received from, for example, the first terminal device 300 or from the group recording reservation broadcasting data 660 received from the server device 600. This will hereinafter referred to as the process of determining the validity of the group recording reservation instruction 370 or the group recording reservation broadcasting data 660. On the basis of the group recording reservation instruction 370 or the group recording reservation broadcasting data 660, it is determined whether or not the group recording reservation should be carried out. More specifically, the received-data identifying unit 531 receives the process-recording device signal Sji input from, for example, the network interface 490. The unit 531 then acquires the group recording reservation instruction 370 or the group recording reservation broadcasting data 660, which is described in the process-recording device signal Sji. The unit 531 converts the group recording reservation instruction 370 or the group recording reservation broadcasting data 660 into a memory signal Sme. The memory signal Sme is output to the memory 520. Thus, the various data items described in the group recording reservation instruction 370 or group recording reservation broadcasting data 660 can be read from the memory 520 as memory signal Sme, whenever required. These data items are then processed to determine whether the group recording reservation instruction 370 or the group recording reservation broadcasting data 660 is valid or not. The received-data identifying unit 531 may receive the process signal Sim input from the input unit 500. In this case, too, the unit 531 acquires the group recording reservation instruction 370 described in the process signal Sim and determines whether the group recording reservation instruction 370 is valid or not. How the received-data identifying unit 531 determines the validity of the group recording reservation instruction 370 or group recording reservation broadcasting data 660 will be detailed later.

The recording unit 532 sets a recording reservation in the first data-recording device 400. More precisely, the recording unit 532 makes a group recording reservation in the fist data-recording device 400 when the received-data identifying unit 531 determines that the group recording reservation should be performed, on the basis of the group recording reservation instruction 370 or the group recording reservation broadcasting data 660. The process that the recording unit 532 performs to make a group recording reservation in the first data-recording device 400 will be described later.

The recording unit 532 makes an ordinary recording reservation in the first data-recording device 400 as will be explained below, on the basis of the process-recording device signal Sji input, for example, the network interface 490. The recording unit 532 receives the process-recording device signal Sji input from the network interface 490. Thus, the unit 532 acquires an ordinary recording reservation instruction data (not shown) described in the signal Sji and representing that the ordinary recording reservation should be made. The unit 532 converts the ordinary recording reservation instruction data into a memory signal Sme. The memory signal Sme is output to the memory 520. Hence, the recording reservation data (not shown) contained in the ordinary recording reservation instruction data can be read from the memory 520 as memory signal Sme, whenever required. Further, the unit 532 generates a recording reservation ID number that corresponds to the recording reservation data read from the memory 520. Then, the unit 532 generates reservation data 514BNr that contains recording reservation data 514E, i.e., the recording reservation data read, and recording reservation ID 514C, i.e., the recording reservation ID number generated. The reservation data 514BNr is incorporated into the recording reservation list 514 stored in the hard disk 510. The number of recording reservations, which is represented by the reservation-number data 514A, is increased by one (1). Note that the reservation data 514BNr is a table that contains no group ID 514D.

Moreover, the recording unit 532 records a TV program on the basis of the reservation data 514BNr, as will be described below. The recording unit 532 keeps acquiring the current-time data from the recording-device clock unit 535. Upon determining that the recording start time included in the recording reservation data 514E that is contained in the reservation data 514BNr is reached, the recording unit 532 causes the tuner 420 to acquire the signal San having video data and audio data, from the antenna 540. The video data and the audio data, both contained in the signal San, are supplied through the demultiplexer 430 and the decoder 440. The video data is output via the video compositor 450 to the hard disk 510. The audio data is output via the audio compositor 460 to the hard disk 510. The hard disk 510 stores the video data and audio data as contents 516. To record the TV program in the form of a stream, the recording unit 532 makes the tuner 420 to supply the video data and audio data contained in the signal San to the hard disk 510 through the demultiplexer 430. Thus, the hard disk 510 stores the video data and audio data, as contents 516. That is, the recording unit 532 can record the TV program in the hard disk 510, by supplying the video data and audio data to the hard disk 510, either through the demultiplexer 430 and the decoder or through only the demultiplexer 430. Thereafter, the recording unit 532 causes the tuner 420 to stop receiving the signal San, thus terminating the recording, when it determines that the recording end time included in the recording reservation data 514E is reached. The unit 532 erases the reservation data 514BNr for recording the TV program from the hard disk 510. At the same time, the number of recording reservations, which is represented by the reservation-number data 514A, is decreased by one (1).

The recording reservation notifying unit 533 generates a group recording reservation notice 580, which is a broadcasting notice of the type illustrated in FIG. 8. The group recording reservation notice 580 is data that makes the server device 600 set a group recording reservation in a data-recording device (e.g., the second data-recording device 401) other than the first data-recording device 400. The recording reservation notifying unit 533 transmits the group recording reservation notice 580 to the server device 600 through the network 200. To be more specific, the recording reservation notifying unit 533 generates the group recording reservation notice 580 when it determines that a group recording reservation should be made, on the basis of the group recording reservation instruction 370 or the group recording reservation broadcasting data 660. How the group recording reservation notice 580 is generated in the recording reservation notifying unit 533 will be described later. The unit 533 converts the group recording reservation notice 580 into a process-recording device signal Sji. The signal Sji is output to the network interface 490.

The group recording reservation notice 580 is a table composed of a source device ID 581, a recording reservation ID 582, a group ID 583, a user ID 584, a recording reservation data 585, and the like. The source device ID 581 specifies the source of the data should be distributed. The group ID 583 designates the group of devices to which data should be broadcast. The user ID 584 identifies the person to whom data should be broadcast. The recording reservation data 585 functions as request data. In some cases, the group recording reservation notice 580 may be a table that excludes the group ID 538 or the user ID 584.

The source device ID 581 is, for example, a device ID number used as source ID data that identifies the first data-recording device 400 instructing a group recording reservation.

The recording reservation ID 582 is, for example, a recording reservation ID number that identifies a group recording reservation designated by the group recording reservation notice 580.

The group ID 583 is, for example, a group ID number used as data that identifies a destination or a group of destinations to which data should be broadcast. It functions also as data that identifies a group of devices in which the group recording reservation should be set. In some cases, the group ID 583 may be a data item that is a table of a plurality of group ID numbers.

The user ID 584 is, for example, a user ID number that identifies the user who owns, for example, the second data-recording device 401 that is a device other than the first data-recording device 400 that makes the group recording reservation. In some cases, the user ID 584 may be a data item that is a table of a plurality of user ID numbers.

The recording reservation data 585 is a table of the recording basic data items such as the recording date, recording start time, recording end time, and channel number.

The recording reservation confirming unit 534 determines whether the group recording reservation should be received from a data-recording device other than the first data-recording device 400, for example the second data-recording device 401. The unit 534 generates group recording setting data (not shown) that is process-setting data representing that group recording reservation should be received or should not be received. The group recording setting data is transmitted to the server device 600 through the network 200. More specifically, the recording reservation confirming unit 534 prompts the user to input data showing whether he or she receives the group recording reservation set in, for example, the second data-recording device 401 in accordance with group recording reservation broadcasting data 660, if the received-data identifying unit 531 has determined that the group recording reservation broadcasting data 660 is valid. When the user input the data, the unit 534 generates group recording reservation data from the data input by the user. The unit 534 then converts the group recording setting data into a process-recording device signal Sji. The signal Sji is output to the network interface 490. How the unit 534 prompts the user to input data showing whether he or she receives the group recording reservation and how it generates the group recording setting data will be explained later.

The recording-device clock unit 535 determines the present time from the reference pulse signal such as the internal clock signal. The recording-device clock unit 535 outputs time data that represents the present time it has determined.

The server device 600 makes a group recording reservation for the data-recording devices other than the first data-recording device 400 that has transmitted the group recording reservation notice 580. That is, the server device 600 makes the group recording reservation for the second data-recording device 401 and the third data-recording device 402. As FIG. 9 shows, the server device 600 has an interface 610, a storage unit 620, a CPU 630 and the like. The interface 610 works as a request-acquiring unit. The storage unit 620 is a server storage unit.

The interface 610 is connected by the network 200 to the first terminal device 300, second terminal device 301, first data-recording device 400, second data-recording device 401, and third data-recording device 402. The interface 610 is connected to the CPU 630, too. The interface 610 can receive a server signal Sba via the network 200 from the terminal devices 300 and 301 and the data-recording devices 400, 401 and 402. Upon acquiring the server signal Sba, the interface 610 performs a preset input-interface process, generating a process server signal Sbb. The process server signal Sbb is output to the CPU 630. Upon acquiring the server signal Sba, too, the interface 610 carries out a preset output-interface process, generating a server signal Sba. The server signal Sba is transmitted via the network 200 to the terminal devices 300 and 301 and the data-recording devices 400, 401 and 402.

The storage unit 620 stores a group list 640 and a user list 650 shown in FIGS. 10A and 10B, respectively. The lists 640 and 650 can be read from the storage unit 620 whenever necessary. The group list 640 and user list 650 are updated when the data input at the terminal devices 300 and 301 and the data-recording devices 400, 401 and 402 is supplied to the sever device 600 through the network 200. The storage unit 620 stores various programs that work on the OS (Operating System), which controls the server device 600 as a whole. The storage unit 620 may be incorporated in a drive or a driver that stores data in a recording medium such as an HD (Hard Disc) or an optical disc.

The group list 640 is a list showing, for example, the data-recording devices 400, 401 and 402 that are registered in the recording reservation broadcasting system 100. The group list 640 is a data item that is a table composed of registered-group-number data 641, registered-group data 642, and the like.

The registered-group-number data 641 is data representing the number of groups that are registered in the group list 640.

The registered-group data 642 is a data item that is a table composed of group data items 6421 to 642Ng (Ng is a natural number). Each of the group data items is a number or group name that identifies a group. Each of the group data items 6421 to 642Ng is a data item that is a table composed of a group ID 642A, additional group data 642B, device-number data 642C, a device ID 642D, and the like.

The group ID 642A is, for example, a group-ID number that identifies the group.

The additional group data 642B is additional data about the group, such as the group name.

The device-number data 642C represents the number of devices that belong to the group.

The device ID 642D is a data item that is a table composed of device IDs 642D 1 to 642DNm (Nm is a natural number). The device IDs are, for example, numbers identifying, for example, the data-recording devices that belong to the group, e.g., the data-recording device 400. The device ID 642DNm, for example, identifies the first data-recording device 400.

The user list 650 is a list of the users who are registered in the recording reservation broadcasting system 100. The user list 650 is a data item that is a table composed of registered-user number data 651, registered-user data 652, and the like.

The registered-user number data 651 is data representing the number of users who are registered in the user list 650.

The registered-user data 652 is a data item that is a table of user data items 6521 to 652Nk (Nk is a natural number), each being, for example, the number assigned to one user or the name of the user. Each of the user data items 6521 to 652Nk is a data item that is a table composed of a user ID 652A, name 652B, mail address 652C, telephone number 652D, device ID 652E and the like.

The user ID 652A, name 652B, mail address 652C and telephone number 652D are the user ID number, name, mail address and telephone number that identify the user, respectively.

The device ID 652E is, for example, the device ID number that identifies, for example, the first data-recording device 400 that the user owns.

The CPU 630 is connected to the storage unit 620. As FIG. 9 depicts, the CPU 630 has various programs. The programs are a reception-notice identifying unit 631 that is a broadcasting control unit, a reservation-broadcasting data generator 632 that is a broadcasting unit, a reservation-condition data generator 633 that functions as a broadcasting control unit, too, and a server-timer unit 634.

The reception-notice identifying unit 631 determines whether a group recording reservation can be set as is desired, from the group recording reservation notice 580 that the server device 600 has received from, for example, the first data-recording device 400. Hereinafter, this shall be referred to as "process of determining the validity of the group recording reservation notice 580." From the group recording reservation notice 580, the unit 631 determines whether or not the second data-recording device 400, for example, should make a group recording reservation. To be more specific, the reception-notice identifying unit 631 acquires the group recording reservation notice 580 described in the process server signal Sbb that has been input from the interface 610. The unit 631 converts the group recording reservation notice 580 into a memory signal Smf. The memory signal Smf is output to the storage unit 620. If necessary, the unit 631 reads the group recording reservation notice 580, as memory signal Smf, from the memory unit 620 and then processes the notice 580 to determine the validity of the group recording reservation notice 580. How the reception-notice identifying unit 631 determines the validity of the notice 580 will be described later in detail.

The reservation-broadcasting data generator 632 generates the group recording reservation-broadcasting data 660 that is illustrated in FIG. 11. The group recording reservation-broadcasting data 660 is used to set a group recording reservation in a data-recording device other than the first data-recording device 400, for example the second data-recording device 401. The reservation-broadcasting data generator 632 transmits the group recording reservation-broadcasting data 660 to, for example, the second data-recording device 401 through the network. More precisely, the reservation-broadcasting data generator 632 generates the group recording reservation-broadcasting data 660 when the reception-notice identifying unit 631 determines that the group recording reservation notice 580 is valid. How the unit 632 generates the data 660 will be detailed later. The group recording reservation-broadcasting data 660, thus generated, is converted to a process server signal Sbb. The process server signal Sbb is output to the interface 610.

The group recording reservation-broadcasting data 660 is a data item that is a table composed of a destination device ID 661, a source device ID 662, a recording reservation ID 663, a group ID 664, a recording reservation data 665, and the like. The group ID 664 is data identifying the group of devices in which processes are carried out. In some cases, the group recording reservation-broadcasting data 660 may be a table that does not contain the group ID 664.

The destination device ID 661 is, for example, a device ID number that identifies a data-recording device other than the first data-recording device 400 that instructs the group recording reservation, for example, the second data-recording device 401. The destination device ID 661 is not a data item that is a table of, for example, a plurality of device ID numbers. In other words, the destination device ID 661 always identifies one and the same device.

The source device ID 662 is, for example, a device ID number that identifies, for example, the data-recording device 400 that instructs that a group recording reservation be made.

The recording reservation ID 663 is, for example, a recording reservation ID number that designates the group recording reservation.

The group ID 664 is, for example, a group ID number that identifies the group of devices for which the group recording reservation will be made.

The recording reservation data 665 is a data item that is a table of recording basic data items, such as the recording date, recording start time, recording end time, and channel number.

The reservation-condition data generator 633 determines whether the second data-recording device 401, for example, which has received the group recording reservation-broadcasting data 660 from the reservation-broadcasting data generator 632, should receive the group recording reservation set by the group recording reservation-broadcasting data 660. The unit 633 generates data representing the condition of group recording reservation and transmits this data to the first data-recording device 400 through the network 200. How the reservation-condition data generator 633 generates this data representing the condition of group recording reservation will be described later.

The server-timer unit 634 detects the present time from a reference pulse signal such as the internal clock signal. The server-timer unit 634 outputs time data that represents the present time it has detected.

[Operation of the Recording Reservation Broadcasting System]

Figure 12:
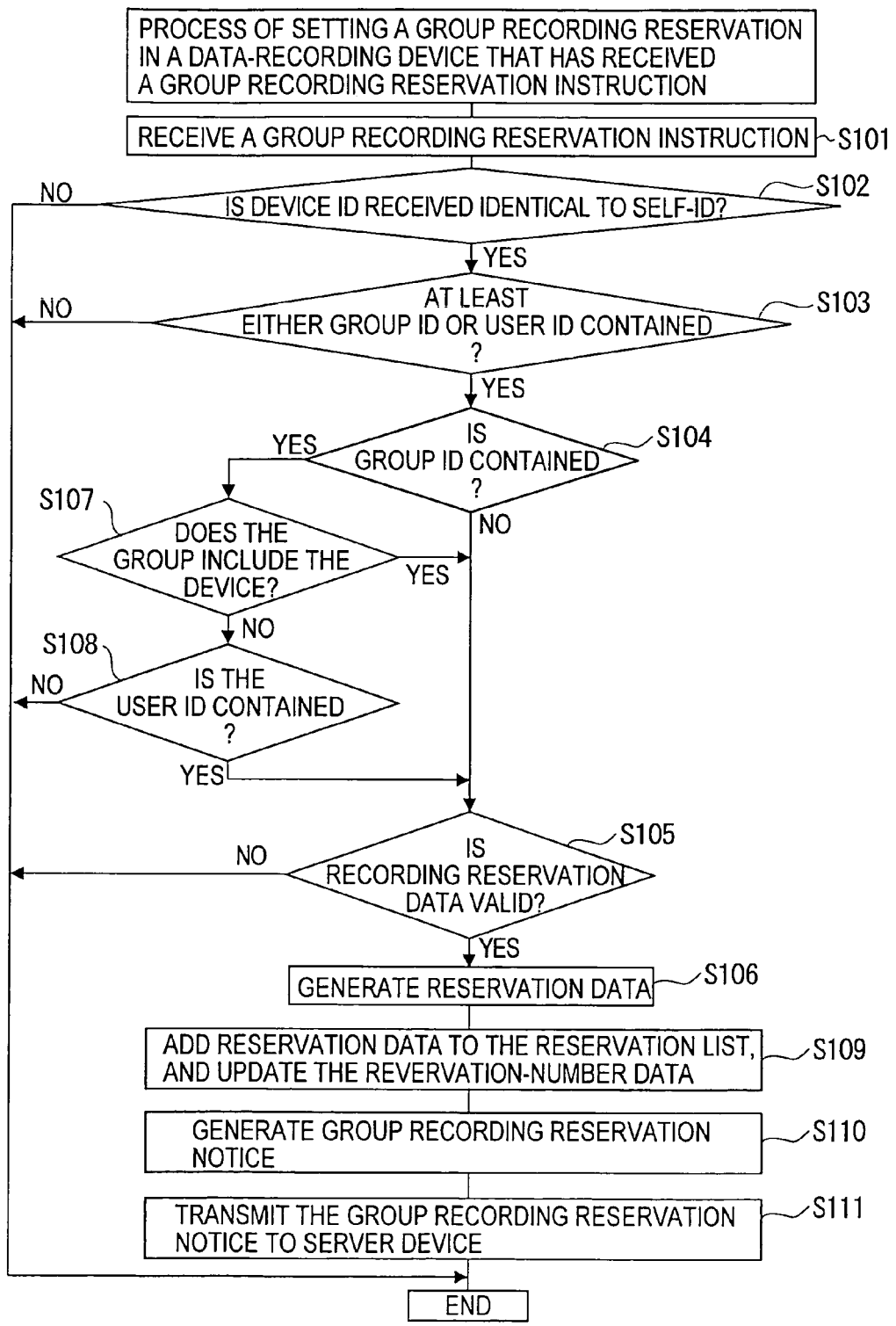
FIG. 12 is a flowchart showing how each data-recording device sets a group recording reservation when the device receives a group recording reservation instruction in the embodiment.

How the recording reservation broadcasting system 100 operates will be explained, with reference to FIG. 12 to FIG. 14. More precisely, it will be described how the system 100 operates to set a group recording reservation not only in the first data-recording device 400, but also in the second and third data-recording devices 401 and 402 that belong to the same group as the first data-recording device 400. It will also be described how the devices for which the group recording reservation should be made, i.e., the second and third data-recording devices 401 and 402, are designated in units of groups. Moreover, it will be explained how the recording reservation broadcasting system 100 operates when the group recording reservation instruction 370 is generated in the first terminal device 300. FIG. 12 is a flowchart explaining how any data-recording device sets a group recording reservation when it receives a group recording reservation instruction 370. FIG. 13 is a flowchart showing how the server device sets a group recording reservation. FIG. 14 is a flowchart illustrating how any data-recording device sets a group recording reservation when it receives group recording reservation-broadcasting data.

(Process of Setting the Group Recording Reservation in the Data-Recording Device That Has Received the Group Recording Reservation Instruction)

First, it will be described how the first data-recording device 400 sets a group recording reservation when the device 400 receives the group recording reservation instruction 370, with reference to FIG. 12.

The user operates the first terminal device 300, generating group recording reservation instruction 370 as will be described below, in order to set the group recording reservation in the group to which the user belongs.

The user operates the terminal input unit 320 of the first terminal device 300 to start the process of setting a group recording reservation.

In the first terminal device 300, the recording reservation generator 351 recognizes that the user has operated the terminal input unit 320 to start the process of setting a group recording reservation. Then, the generator 351 causes the terminal display unit 330 to display a menu that prompts the user to input various data items designating the group or friends for which the group recording reservation should be made. The menu displayed by the terminal display unit 330 may be one that prompts the user to input the group ID number or the names of the friends. Alternatively, the menu may be a table of group names, one of which the user may select or a table of user ID numbers, at least two of which the user may select.

In accordance with the menu that the terminal display unit 330 displays, the user operates the terminal input unit 320, inputting a group name and a group ID number, or user names and user ID numbers, or the like. In this instance, to designate the second data-recording device 401 and the third data-recording device 402, the user inputs the name or ID number of the group consisting of the first to third data-recording devices 400, 401 and 402.

The recording reservation generator 351 recognizes the group name and group ID number thus input to designate the group for which the group recording reservation is to be made. Then, the generator 351 searches the group-related data 360 stored in the memory 340 and retrieves the group data item 363Nj that contains the group ID 363A and additional group data item 363B, which are identical to the group name and group ID number that have been recognized. The group ID 363A contained in the group data item 363Nj is thus read from the memory 340. If two or more group names and group ID numbers are input, a plurality of group IDs 363A contained in the group data item 363Nj will be read from the memory 340.

The recording reservation generator 351 may recognize a user name and a user ID number input to designate the group for which the group recording reservation is to be made. In this case, the generator 351 searches the group-related data 360 stored in the memory 340 and retrieves the user data item 365Nk that contains the user ID 365A and additional group data item 365B, which are identical to the user name and user ID number that have been recognized. The user ID 365A contained in the user data item 365Nk is thus read from the memory 340. If two or more user names and user ID numbers are input, a plurality of user IDs 365A contained in the user data item 363Nk will be read from the memory 340.

Next, the recording reservation generator 351 makes the terminal display unit 330 display a menu that prompts the user to input recording basic data items.

In accordance with the menu that the terminal display unit 330 displays, the user operates the terminal input unit 320, inputting the recording basic data items.

Upon recognizing that the recording basic data items have been input, the recording reservation generator 351 reads them. Then, the generator 351 reads the self-ID 361 from the group-related data 360 stored in the memory 340.

The recording reservation generator 351 generates a group recording reservation instruction 370. The instruction 370 contains the self-ID 371, group ID 372, user ID 373 and recording reservation data 374, which are identical to the self-ID 361 read, group ID 363A, user ID number 365A and recording basic data items, respectively. In this instance, the user has already input the group name and the group ID number, the group recording reservation instruction 370 is a table that does not contain the user ID 373. Thereafter, the group recording reservation instruction 370, thus generated, is transmitted through the network 200 to the first data-recording device 400.

The first data-recording device 400 receives the group recording reservation instruction 370 from the first terminal device 300 (Step S101). In the device 400, the group recording reservation instruction 370 is stored into the memory 520 by the received data identifying unit 531. The instruction 370 can be read from the memory 520, whenever necessary.

Next, the received-data identifying unit 531 reads the group recording reservation instruction 370 from the memory 520. The unit 531 also reads the self-ID 512A contained in the group-related data 512 stored in the hard disk 510. Thereafter, it is determined whether the self-ID 512A is identical to the self-ID 371 contained in the group recording reservation instruction 370 (Step S102).

If the self-ID 512A is not found identical to the self-ID 371 in the Step S102, it is determined that the group recording reservation instruction 370 has not been transmitted to the first data-recording device 400. That is, the group recording reservation instruction 370 is determined to be invalid. Hence, the process of setting the group recording reservation is terminated.

If the self-ID 512A is found identical to the self-ID 371 in the Step S102, it is determined that the group recording reservation instruction 370 has been transmitted to the first data-recording device 400. In this case, it is determined whether the group recording reservation instruction 370 contains at least either the group ID 372 or the user ID 373 (Step S103).

If it is determined in the Step S103 that the group recording reservation instruction 370 contains neither the group ID 372 nor the user ID 373, the instruction 370 is found not valid. In this case, the process of setting the group recording reservation is terminated.

If it is determined in the Step S103 that the group recording reservation instruction 370 contains at least either the group ID 372 or the user ID 373, it is then determined whether the instruction 370 contains the group ID 372 (Step S104).

If the instruction 370 is found, in the Step S104, not contain the group ID 372, it is determined whether the recording reservation data 374 contained in the instruction 370 is valid or not (Step S105). The validity of the recording reservation data 374 is determined in accordance with whether the recording start time set in the recording reservation data 374 has yet to come, or in accordance with whether a recording reservation is set at present.

If the recording reservation data 374 is found invalid in the Step S105, it is determined that the group recording reservation instruction 370 received in the Step S101 is invalid. The process of setting the group recording reservation is terminated.

By contrast, the recording reservation data 374 may be found valid in the Step S105. Then, it is determined that the group recording reservation instruction 370 is valid. In the fist data-recording device 400, the recording unit 532 generates reservation data 514BNr (Step S106), as will be described below.

The recording unit 532 extracts the group ID 372 and the recording reservation data 374 from the group recording reservation instruction 370. The unit 532 generates the recording reservation ID number that corresponds to the recording reservation data 374 extracted from the instruction 370. The unit 532 generates a reservation data 514BNr. The reservation data 514BNr contains a group ID 514D, a recording reservation data 514E and a recording reservation ID 514C, which are identical to the group ID 372 extracted, recording reservation data 374 extracted, and recording reservation ID number generated, respectively. The first data-recording device 400 may perform the Steps S103 to Si 06. If this is the case, it is determined in the Step S104 that the group recording reservation instruction 370 does not contain the group ID 372. Hence, the reservation data 514BNr generated by sequentially performing the Steps S104, S105 and S106 is a table that does not contain the group ID 514D.

In the Step S104, the group recording reservation instruction 370 may not be found to contain the group ID 372. If this is the case, the received-data identifying unit 531 determines whether the group identified by the group ID 372, i.e., the group for which the group recording reservation should be made, includes the first data-recording device 400 (Step S107). More specifically, the received-data identifying unit 531 retrieves group data 512CNj that contains the group ID 512F identical to the group ID 372, from the group-related data 512 stored in the hard disk 510. If the group-related data 512 contains the group data 512CNj, the unit 531 determines that the first data-recording device 400 belongs to the group for which the group recording reservation is to be made. If the group-related data 512 does not contain the group data 512CNj, the unit 531 determines that the first data-recording device 400 does not belong to the group for which the group recording reservation should be made.

The group for which the group recording reservation should be made may be found in the Step S107 to include the first data-recording device 400. It is determined that the group ID 372 contained in the group recording reservation instruction 370 is valid. The process of the Step S105 is therefore carried out. Thereafter, the first data-recording device 400 may generate the reservation data 514BNr in the Step S106. In this case, it is determined in the Step S107 that the group ID 372 contained in the group recording reservation instruction 370 is valid. Therefore, the reservation data 514BNr, which is generated as the Steps S103, S104, S107, S105 and S106 are performed in the order mentioned, is a table that contains the group ID 514D.

In the Step S107, the group for which the group recording reservation should be made, may be found not to include the first data-recording device 400. In this case, the group ID 372 contained in the group recording reservation instruction 370 is determined invalid. Then, it is determined whether the group recording reservation instruction 370 contains the user ID 373 (Step S108).

The received-data identifying unit 531 may determine in the Step S108 that the group recording reservation instruction 370 does not contain the user ID 373. If this is the case, the unit 531 determines that the group recording reservation instruction 370 is invalid. Thus, the process of setting the group recording reservation is terminated.

If the unit 531 determines in the Step S108 that the group recording reservation instruction 370 contains the user ID 373, the process of the Step S105 is carried out. Thereafter, the first data-recording device 400 may perform the process of the Step S106 and may generate the reservation data 514BNr. In this case, the group ID 372 contained in the group recording reservation instruction 370 is found invalid in the Step S107. The reservation data 514BNr generated by sequentially performing the Steps S103, S104, S107, S108, S105 and S106 is a table that does not contain the group ID 514D.

In the first data-recording device 400, the recording unit 532 incorporates the reservation data 514BNr generated in the Step S106, into the recording reservation list 514 stored in the hard disk 510. Then, the unit 532 increases the number of recording reservations by one (Step S109).

Then, the recording reservation notifying unit 533 generates the group recording reservation notice 580 (Step S110), as will be explained below.

The recording reservation notifying unit 533 reads the self-ID 371, group ID 372, user ID 373 and recording reservation data 374 from the group recording reservation instruction 370. The unit 533 also reads the recording reservation ID 514C from the reservation data 514BNr that is stored in the hard disk 510. The unit 533 then generates a group recording reservation notice 580 that contains the self-ID 371, group ID 372, user ID 373, recording reservation data 374 and recording reservation ID 514C. The IDs 371, 372, 373, 374 and 514C are used as source device ID 581, group ID 583, user ID 584, recording reservation data 585 and recording reservation ID 582.

The group ID 372, for example, in the group recording reservation instruction 370 may contain a plurality of group ID numbers. In this case, the group ID 583 contained in the group recording reservation notice 580 is a table of group ID numbers. If the group recording reservation instruction 370 does not contain the group ID 372, the group recording reservation notice 580 will be a table that does not contain the group ID 538. In this instance, the group recording reservation instruction 370 does not contain the user ID 373. Therefore, the group recording reservation notice 580 is a table that does not contain the user ID 584.

Next, the recording reservation notifying unit 533 transmits the group recording reservation notice 580 generated in the Step S110, to the server device 600 through the network 200 (Step S111). The process of setting the group recording reservation is thus terminated.

(Process of Setting the Group Recording Reservation in the Server Device)

How the group recording reservation is set in the server device 600 will be described, with reference to FIG. 13.

First, the server device 600 receives the group recording reservation notice 580 transmitted in the Step S111 from the first data-recording device 400 (Step S201). In the server device 600, the reception-notice identifying unit 631 writes the group recording reservation notice 580 into the memory unit 620, so that the notice 580 may be read from the memory unit 620 whenever necessary.

Next, the reception-notice identifying unit 631 determines whether at least either the group or users, or both, described in the group recording reservation notice 580 have been registered in the server device 600 (Step S202). To be more specific, the reception-notice identifying unit 631 in the server device 600 reads the group recording reservation notice 580 that is stored in the storage unit 620. It then retrieves the group data item 642Ng containing the group ID 642A that is identical to the group ID 583 contained in the group recording reservation notice 580 from the group list 640 stored in the storage unit 620. If the group list 640 contains the group data item 642Ng, the unit 631 determines that the group for which the group recording reservation should be made is registered in the server device 600. If the group list 640 does not contain the group data item 642Ng, the unit 631 determines that the group for which the group recording reservation should be made is not registered in the server device 600. Similarly, the reception-notice identifying unit 631 retrieves the user data item 652Nk containing the user ID 652A that is identical to the user ID 584 contained in the group recording reservation notice 580. From the user data item 652Nk, the unit 631 determines whether the user for whom the group recording reservation should be made is registered in the server device 600.

The reception-notice identifying unit 631 may determine, in the Step S202, that the group or users described in the group recording reservation notice 580 have not been registered in the server device 600. If this is the case, it is determined that the group recording reservation notice 580 is invalid. Thus, the process of setting the group recording reservation is terminated.

The reception-notice identifying unit 631 may determine, in the Step S202, the group or users described in the group recording reservation notice 580, or both, have been registered in the server device 600. Then, the unit 631 determines whether the group for which the group recording reservation should be made is registered in the server device 600 (Step S203).

If the unit 631 determines in the Step S203 that the group for which the group recording reservation is to be made is not registered in the server device 600, it determines that the only the users for whom the group recording reservation is to be made are registered in the server device 600. Then, the unit 631 determines whether the recording reservation data 585 contained in the group recording reservation notice 580 is valid or not (Step S204). The validity of the recording reservation data 585 can be determined in accordance with whether the recording start time set in the recording reservation data 585 has yet to come.

If the reception-notice identifying unit 631 determines in the Step S204 that the recording reservation data 585 is invalid, it determines that the group recording reservation notice 580 is invalid. In this case, the process of setting the group recording reservation is terminated.

On the other hand, the reception-notice identifying unit 631 may determine in the Step S204 that the recording reservation data 585 is valid. Then, the unit 631 determines that the group recording reservation notice 580 received in the Step S201 is valid. In this case, the reservation-broadcasting data generator 632 provided in the server device 600 generates the group recording reservation-broadcasting data 660 (Step S205), as will be described below.

First, the reservation-broadcasting data generator 632 reads the device ID 642DNm and device ID 652E from, respectively, the group data item 642Ng and user data item 652Nk which have been retrieved and read by the reception-notice identifying unit 631. Further, the unit 632 reads the source device ID 581, recording reservation ID 582, group ID 583 and recording reservation data 585 from the group recording reservation notice 580. Then, the unit 632 generates the group recording reservation-broadcasting data 660 that contains a destination device ID 661, source device ID 662, recording reservation ID 663, group ID 664 and recording reservation data 665. The destination device ID 661 is either the device ID 642DNm or the device ID 652E; the source device ID 662 is the source device ID 581; the recording reservation ID 663 is the recording reservation ID 582; the group ID 664 is the group ID 583; and the recording reservation data 665 is the recording reservation data 585.

At this time, the destination device ID 661 is data that designates one data-recording device, for example, the second data-recording device 401, as mentioned above. The group recording reservation-broadcasting data 660 therefore consists of as many device IDs 652E as read, if the group recording reservation has been set for a plurality of users. If the group recording reservation has been set for one group, one of the device IDs 642DNm contained in the group data item 642Ng is identical to the source device ID 581. In this case, the group recording reservation-broadcasting data 660 consists of device IDs 652E, the number of which is one less than the number of the device IDs 642DNm. If the server device 600 performs the process of the Steps S202 to S205, it is determined in the Step S203 that the group for which the group recording reservation should be made is not registered in the server device 600. Thus, the group recording reservation-broadcasting data 660 generated by sequentially performing the Steps S202, S203, S204 and S205 is a table that contains the destination device ID 661, source device ID 662, recording reservation ID 663 and recording reservation data 665, but not the group ID 664.

Thereafter, the reservation-broadcasting data generator 632 transmits the group recording reservation-broadcasting data 660 generated in the Step S205, to, for example, the second data-recording device 401 and third data-recording device 402 that are identified by the destination device ID 661 (Step S206).

The reception-notice identifying unit 631 may determine, in the Step S203, that the group for which the group recording reservation is to be made is registered in the server device 600. Then, it determines whether the first data-recording device 400 that has transmitted the group recording reservation notice 580 belongs to the group for which the group recording reservation is to be made (Step S207). More specifically, the unit 631 retrieves the device ID 642DNm that is identical to the source device ID 581 contained in the group recording reservation notice 580, from the group data item 642Ng that has been retrieved and read in the Step S202. If the device ID 642DNm that meets this condition is retrieved from the group data item 642Ng, the unit 631 determines that the first data-recording device 400 that has transmitted the group recording reservation notice 580 belongs to the group for which the group recording reservation should be made. The device ID 642DNm that meets this condition may not be retrieved from the group data item 642Ng. In this case, the unit 631 determines that the first data-recording device 400 that has transmitted the group recording reservation notice 580 does not belong to the group.

If it is determined in the Step S207 that first data-recording device 400 that has transmitted the group recording reservation notice 580 belongs to the group, the unit 631 determines that the group ID 583 contained in the group recording reservation notice 580 is valid. The process of the Step S204 is then carried out. Thereafter, the server device 600 may perform the Step S205, generating the group recording reservation-broadcasting data 660. In this case, the group ID 583 contained in the group recording reservation notice 580 is found valid in the Step S207. Hence, the group recording reservation-broadcasting data 660 generated by sequentially performing the Steps S202, S203, S207, S204 and S205 is a table that contains the destination device ID 661, source device ID 662, recording reservation ID 663, group ID 664 and recording reservation data 665.

As indicated above, the group recording reservation notice 580 contains the group ID 538 for the group, but not the user ID 584, in this instance. The server device 600 therefore performs the Steps S201, S202, S203, S207 and S204. In the Step S205, the server device 600 generates two items of group recording reservation-broadcasting data 660. The first data item contains a destination device ID 661 that designates the second data-recording device 401. The second data item contains a destination device ID 661 that designates the third data-recording device 402. The two items of group recording reservation-broadcasting data 660 are then transmitted to the second data-recording device 401 and the third data-recording device 402, respectively.

The first data-recording device 400 that has transmitted the group recording reservation notice 580 may not be found to belong to the group, in the Step S207. It is then determined that the group ID 583 contained in the group recording reservation notice 580 is invalid. In this case, it is determined that the users for whom the group recording reservation should be made have been registered in the server device 600 (Step S208).

The reception-notice identifying unit 631 may determine in the Step S208 that the users are not registered in the server device 600. It is therefore determined that the group recording reservation notice 580 is invalid. Hence, the process of setting the group recording reservation is terminated.

Conversely, the reception-notice identifying unit 631 may determine in the Step S208 that the users are registered in the server device 600. If this is the case, the process of the Step S204 is carried out. Thereafter, the server device 600 may perform the Step S205, generating the group recording reservation-broadcasting data 660. Thus, the group ID 583 contained in the group recording reservation notice 580 is found invalid in the Step S207. The group recording reservation-broadcasting data 660 generated by sequentially performing the Steps S202, S203, S207, S208, S204 and S205 is a table that contains the destination device ID 661, source device ID 662, recording reservation ID 663 and recording reservation data 665, but not the group ID 664.

In the server device 600, the reservation-condition data generator 633 acquires the present-time data from the server-timer unit 634 after the server device 600 has transmitted the group recording reservation-broadcasting data 660. Upon lapse of a preset period of, for example, 5 minutes, it is determined whether group recording setting data has arrived from all devices to which the data 660 has been transmitted, that is, both the second data-recording device 401 and the third data-recording device 402 (Step S209). Whether the group recording setting data has come from the second data-recording device 401 or the third data-recording device 402 can be determined in accordance with whether the recording reservation ID (not shown) contained in the group recording setting data is identical to the recording reservation ID 663 contained in the group recording reservation-broadcasting data 660. The preset period need not be limited to 5 minutes. Instead, it may be, for example, 3 minutes or 10 minutes.

In the Step S209, it may be determined that the reservation-condition data generator 633 has received group recording setting data from both the second data-recording device 401 and the third data-recording device 402. If this is the case, the unit 633 generates group recording reservation-condition data from the two items of group recording setting data (Step S210). The group reservation-condition data contains the information that the second data-recording device 401 has received the group recording reservation but the third data-recording device 402 has rejected the group recording reservation.

Thereafter, the server device 600 transmits the group recording reservation-condition data that the reservation-condition data generator 633 has generated in the Step S210, to the first data-recording device 400, in accordance with the source device ID 662 contained in the group recording reservation-broadcasting data 660 (Step S211). Then, the process of setting the group recording reservation is terminated.

In the Step S209, it may be determined that the reservation-condition data generator 633 has not received group recording setting data from both the second data-recording device 401 and the third data-recording device 402. In this case, it is determined which data-recording device has not sent back the group recording setting data. Further, the reservation-condition data generator 633 acquires the present-time data from the server-timer unit 634. From the recording reservation data 665 contained in the group recording reservation-broadcasting data 660, the unit 633 detects the group recording start time. Assume that the second data-recording device 401 has sent back the group recording setting data, while the third data-recording device 402 has not sent back the group recording setting data. Then, it is determined whether time equal to or longer than a preset period of, for example, 30 minutes is available before the group recording start time (Step S212). The preset period is not limited to 30 minutes, nonetheless. It may be 5 minutes or one hour.

If it is determined in the Step S212 that time equal to or longer than the preset period is not available before the group recording start time, the reservation-condition data generator 633 performs the process of the Step S210, generating group recording reservation-condition data. In this case, it has been determined in the Step S209 that only the second data-recording device 401 has sent back the group recording setting data. Therefore, the group recording reservation-condition data generated by sequentially performing the Steps S209, S212 and S210 contains not only the data showing that the second data-recording device 401 has received the group recording reservation data, but also the data showing that it has not been confirmed whether the third data-recording device 402 has received the group recording reservation data.

In the Step S212, it may be determined that time equal to or longer than the preset period is available before the group recording start time. If this is the case, the group recording reservation-broadcasting data 660 is transmitted again to the third data-recording device 402 that has not sent back the group recording setting data (Step S213). Then, the operation returns to the Step S209.

(Process of Setting the Group Recording Reservation in the Data-Recording Device That Has Received the Group Recording Reservation-Broadcasting Data)

How the group recording reservation-broadcasting data 660 sets a group recording reservation in the second and third data-recording devices 401 and 402 that has received the data 660 will be described, with reference to FIG. 14. More correctly, it will be described how the group recording reservation is set in the second data-recording device 401.

The second data-recording device 401 receives the group recording reservation-broadcasting data 660 from the server device 600 (Step S301). Then, the received-data identifying unit 531 writes the group recording reservation-broadcasting data 660 into the memory 520. Thus, the data 660 can be read from the memory 520 whenever necessary.

Next, the received-data identifying unit 531 reads the group recording reservation-broadcasting data 660 from the memory 520. Further, the unit 531 reads the self-ID 512A contained in the group-related data 512, from the hard disk 510. Thereafter, the unit 531 determines whether the self-ID 512A is identical to the destination device ID 661 contained in the group recording reservation-broadcasting data 660 (Step S302).

In the Step S302, the self-ID 512A may not be found identical to the destination device ID 661. Then, it is determined that the group recording reservation-broadcasting data 660 is invalid. In this case, the process of setting the group recording reservation is terminated.

Conversely, the self-ID 512A may be found identical to the destination device ID 661 in the Step S302. In this case, it is determined whether the group recording reservation-broadcasting data 660 contains the group ID 664 (Step S303).

The group recording reservation-broadcasting data 660 may be found not to contain the group ID 664, in the Step S303. Then, it is determined whether the recording reservation data 665 contained in the group recording reservation-broadcasting data 660 is valid or not, in the same way as in the Step S105 (Step S304).

If the recording reservation data 665 is found invalid in the Step S304, the received-data identifying unit 531 determines that the group recording reservation-broadcasting data 660 received in the Step S301 is invalid. In this case, the process of setting the group recording reservation is terminated.

Conversely, the recording reservation data 665 may be found valid in the Step S304. Then, the unit 531 determines that the group recording reservation-broadcasting data 660 is valid. In the second data-recording device 401, the recording reservation confirming unit 534 determines whether the group recording reservation set in accordance with the group recording reservation-broadcasting data 660 should be received or not (Step S305). This decision can be made by displaying a message that prompts the user to input data showing that he or she wants to reserve the recording, and also displaying the various data items contained in the recording reservation data 665 included in the group recording reservation-broadcasting data 660, on the display unit 560. In accordance with the data the user has input by operating the input unit 500, the unit 534 determines whether the group recording reservation should be received or not.

In the Step S303, the received-data identifying unit 531 may determine that the group recording reservation-broadcasting data 660 contains the group ID 664. In this case, the unit 531 determines whether the group identified by the group ID 664 includes the second data-recording device 401 (Step S306). That is, the unit 531 retrieves the group data item 512CNj that contains the group ID 512F identical to the group ID 664, from the group-related data 512 stored in the hard disk 510.

In the Step S306, the group identified by the group ID 664 may be found not to include the second data-recording device 401. Then, the unit 531 determines that the group recording reservation-broadcasting data 660 is invalid. In this case, the process of setting the group recording reservation is terminated.

On the other hand, in the Step S306, it may be determined that the group identified by the group ID 664 includes the second data-recording device 401. Then, the process of the Step S304 is carried out.

In the second data-recording device 401, the recording reservation confirming unit 534 first confirms, in the Step S305, that the group recording reservation should be received and then acquires the present-time data from the recording-device clock unit 535. Upon lapse of a preset period of, for example, 1 minute, the unit 534 determines whether the group recording reservation data can be received (Step S307). This period is not limited to 1 minute; it may be 30 seconds or 5 minutes, instead.

The recording reservation confirming unit 534 may determine, in the Step S307, that the group recording reservation data cannot be received. In this case, it is determined that the user of the second data-recording device 401 cannot confirm the information displayed on the display unit 560 in the Step S305. Then, the recording reservation confirming unit 534 generates reservation-receipt confirmation data (Step S308). The reservation-receipt confirmation data contains the data item representing a menu, the source device ID 662 contained in the group recording reservation-broadcasting data 660, the various data items contained in the recording reservation data 665, and the data to be displayed on the terminal display unit 330. The menu is to be displayed on the terminal display unit 330 to prompt the user to input the data showing whether the group recording reservation should be received or not.

Thereafter, the recording reservation confirming unit 534 transmits the reservation-receipt confirmation data generated in the Step S308, to the second terminal device 301 connected to the second data-recording device 401 through the network 200 (Step S309). To be more specific, the unit 532 extracts the mail address 513A from the user-management data 513 stored in the hard disk 510. In accordance with the mail address 513A, the unit 534 transmits the reservation-receipt confirmation data to the second terminal device 301. In the second terminal device 301, the terminal display unit 330 displays the various data items contained in the reservation-receipt confirmation data. These data items displayed on the unit 330 prompt the user of the second data-recording device 401 to input data showing whether he or she receives or rejects the group recording reservation. Then, the operation returns to the Step S307. In the Step S307, the unit 534 determines whether the group recording reservation data can be received or not.

In the Step S307, the recording reservation confirming unit 534 may determine that the group recording reservation data can be received. If this is the case, the unit 534 determines whether the data to be received shows that the group recording reservation should be received (Step S310).

In the Step S310, the unit 534 may determine that the data should be rejected. In this case, the second data-recording device 401 generates group recording reservation setting data (Step S311). The group recording reservation setting data contains the recording reservation ID 663 and the data showing that the device 401 rejects the group recording reservation. Note that the reservation ID 663 is contained in the group recording reservation-broadcasting data 660. The group recording reservation setting data is transmitted to the server device 600 (Step S312). Thus, the process of setting the group recording reservation is terminated.

In the second data-recording device 401, the recording reservation confirming unit 534 may determine that the data confirmed in the Step S310 shows that the group recording reservation should be received. Then, the unit 532 generates reservation data 514BNr (Step S313), as will be detailed below.

In the second data-recording device 401, the recording unit 532 first extracts the reservation ID 663, group ID 664 and recording reservation data 665 from the group recording reservation-broadcasting data 660. The unit 532 then generates reservation data 514BNr that contains a recording reservation ID 514C (i.e., reservation ID 663), a group ID 514D (i.e., group ID 664) and a recording reservation data 514E (i.e., recording reservation data 665).

Thereafter, the recording unit 532 incorporates the reservation data 514BNr generated in the Step S313 into the recording reservation list 514 stored in the hard disk 510. The unit 532 then increases, by one, the number of recording reservations represented by the reservation-number data 514A (Step S314). The process of the Step S311 is performed. The recording reservation confirming unit 534 generates group recording setting data. In the Step S310, it has been determined that the group recording reservation should be received. Therefore, the group recording setting data, which has been generated by sequentially performing the Steps S310, S313, S314 and S311 contains the data showing that the second data-recording device 401 should receive the group recording reservation. Thus, the process of the Step S312 is carried out, and the process of setting the group recording reservation is terminated.

In the first data-recording device 400 of the recording reservation broadcasting system 100, the network interface 490 receives the group recording reservation instruction 370 containing the recording reservation data 374 as described above. The recording unit 532 sets the recording reservation in accordance with the recording reservation data 374 contained in the group recording reservation instruction 370. Thereafter, the recording reservation notifying unit 533 of the first data-recording device 400 transmits data similar to the recording reservation data 374, to the second data-recording device 401 and the third data-recording device 402. Once this data similar to the data 374 has been transmitted to the data-recording devices 401 and 402, the data-recording devices 401 and 402 can record a TV program as the first data-recording device 400. The user of, for example, the second data-recording device 401 can therefore enjoy the same TV program as the user of the first data-recording device 400, though he or she has not set the recording reservation in the second data-recording device 401. The user of the second data-recording device 401 can enjoy the TV program recorded in the device 401. The user need not borrow a DVD in which the TV program has been recorded. Thus, the copyright to the TV program can be protected.

The data-recording devices 400, 401 and 402 incorporate a recording-device clock unit 535 each. The clock unit 535 that keeps clocking time can give the present-time data. The recording reservation data 374 is set in accordance with the request data. In each of the data-recording devices 400, 401 and 402, the recording unit 532 starts recording the data reserved, when the time clocked by the recording-device clock unit 535 coincides with the recording start time contained in the recording reservation data 374. Since the recording reservation data is set in accordance with the request data, the second data-recording device 401, for example, can record the same TV program as the first data-recording device 400, though it takes some time to transmit data similar to the recording reservation data 374 to the second data-recording device 401.

The data-recording devices 400, 401 and 402 incorporate a hard disk 510 each, which records TV programs. The process initiated in accordance with the request data is to record TV programs. Once TV programs have been recorded in the hard disk 510, they can be quickly reproduced because a random access can be made to the hard disk 510.

The group recording reservation instruction 370 contains a group ID 372 and a user ID 373. The group ID 372 designates the data-recording devices 401 and 402, and the user ID 373 designates the users, in order to achieve the group recording reservation. In the first data-recording device 400, the recording reservation notifying unit 533 generates data similar to the recording reservation data 374 and transmits it to the data-recording devices 401 and 402 designated by the group ID 372 or user ID 373. Thus, the devices for which the group recording reservation should be made can be changed, merely by changing the group ID 372 or the user ID 373. The first data-recording device 400 is a versatile because it can select devices that should be subjected to the group recording reservation.

The first data-recording device 400 has the received-data identifying unit 531. From the group recording reservation instruction 370, the unit 531 determines whether the recording reservation notifying unit 533 should transmit data similar to the recording reservation data 374. In other words, the received-data identifying unit 531 determines whether the reservation instruction 370 is valid or not. Thus, in the first data-recording device 400, the received-data identifying unit 531 determines that the reservation instruction 370 is invalid if the instruction 370 contains recording reservation data 374 representing the recording start time already reached or if the instruction 370 is incomplete, missing a part. If the instruction 370 is found invalid, the unit 531 inhibits the recording reservation notifying unit 533 from transmitting the data similar to the recording reservation data 374. Hence, the first data-recording device 400 transmits the data similar to the recording reservation data 374 to achieve a group recording reservation, on the basis of only the valid group recording reservation instruction 370 that contains information necessary to achieve the group recording reservation. Thus, even if the first data-recording device 400 receives a group recording reservation instruction 370 that is invalid, it will not set the group recording reservation in accordance with this reservation instruction 370. This prevents the data-recording devices 401 and 402 from malfunctioning.

The group recording reservation instruction 370 contains the self-ID 371 that designates, for example, the first data-recording device 400 which instructs the group recording reservation. Further, the hard disk 510, which in turn is provided in the first data-recording device 400, stores the self-ID 512A that designates the first data-recording device 400. In the first data-recording device 400, the received-data identifying unit 531 determines whether the self-ID 371 and the self-ID 512A are identical to each other. If the self-ID 371 and the self-ID 512A are found identical, it is determined that the group recording reservation instruction 370 has been transmitted to the first data-recording device 400. Then, the data similar to the recording reservation data 374 is transmitted to the data-recording devices 401 and 402, in accordance with the group ID 372 or the user ID 373. If the self-ID 371 and the self-ID 512A are found not identical, it is determined that the group recording reservation instruction 370 has not been transmitted to the first data-recording device 400. In this case, the data similar to the recording reservation data 374 is not transmitted to the data-recording devices 401 or the data-recording device 402. Thus, the first data-recording device 400 sets the group recording reservation in accordance with the group recording reservation instruction 370. However, the device 400 will not set the group recording reservation even if it receives the instruction 370 that has been transmitted to any other data-recording device, for example, the second data-recording device 401. Therefore, any TV program recorded in accordance with the group recording reservation set in the first data-recording device 400 can be made to meet the taste of the user who owns the first data-recording device 400.

The recording reservation broadcasting system 100 has the server device 600 that can transmit and receive various data items to and from the data-recording devices 400, 401 and 402 through the network 200. The group recording reservation instructed from, for example, the first data-recording device 400, is set in the data-recording devices 401 and 402, too, through the network 200 and the server device 600. That is, the group recording reservation is set via the server device 600 that can process a great amount of data. Hence, the group recording reservation instructed from, for example, the first data-recording device 400, can be set in, for tens of devices fast and easily. Further, the data-recording devices 400, 401 and 402 can be made simple in structure, because the server device 600 can hold the data that is required to set the group recording reservation.

The first data-recording device 400 incorporates the recording reservation notifying unit 533 that generates a group recording reservation notice 580 and transmits the notice 580 to the server device 600 through the network 200. The group recording reservation notice 580 demands that the data similar to the recording reservation data 374 be transmitted to the data-recording devices 401 and 402. In accordance with the group recording reservation notice 580, the reservation-broadcasting data generator 632 of the server device 600 generates the group recording reservation-broadcasting data 660 that contains the recording reservation data 665 similar to the recording reservation data 374. The group recording reservation-broadcasting data 660 is transmitted the data-recording devices 401 and 402 through the network 200. Thus, the recording reservation data 665, which is similar to the recording reservation data 374, is transmitted to the data-recording devices 401 and 402 via the network 200 and server device 600. The data-recording devices 401 and 402 can record the same TV program as in the first data-recording device 400, though they are provided remote from the first data-recording device 400.

The server device 600 has the reception-notice identifying unit 631 that determines, from the group recording reservation notice 580, whether the reservation-broadcasting data generator 632 should transmit the group recording reservation-broadcasting data 660 to the data-recording devices 401 and 402. In other words, the reception-notice identifying unit 631 determines whether the group recording reservation-broadcasting data 660 is valid or not. In the server device 600, the reception-notice identifying unit 631 determines that the group recording reservation notice 580 is invalid if the recording start time is contained in the recording reservation data 585 that has already been set, or if the group recording reservation notice 580 received is incomplete, missing a part. In this case, the group recording reservation-broadcasting data 660 is not transmitted to the data-recording devices 401 or the data-recording device 402. Therefore, the server device 600 generates the group recording reservation-broadcasting data 660 from only the valid group recording reservation notice 580 that contains the data required to set the group recording reservation. The data 660 thus generated is transmitted to the data-recording devices 401 and 402. Thus, the sever device 600 does not serve to set the group recording reservation on the basis of the group recording reservation notice 580 if the notice 580 is found invalid. This prevents the data-recording devices 401 and 402 from malfunctioning. In addition, neither the data-recording device 401 nor the data-recording device 402 needs to have a received-data identifying unit 531 since the sever device 600 incorporates the reception-notice identifying unit 631. Hence, the data-recording devices 400, 401 and 402 can be simple in terms of structure.

The group recording reservation notice 580 contains the user ID 584 that identifies the data-recording devices 401 and 402 for which the group recording reservation is performed. The server device 600 incorporates the storage unit 620 that stores the user ID 652A. The user ID 652A designates the data-recording device 401 and 402 that are registered in the recording reservation broadcasting system 100. In the server device 600, the reception-notice identifying unit 631 determines whether the storage unit 620 stores the user ID 652A that is identical to the user ID 584. The unit 631 may determine that the storage unit 620 stores the user ID 652A identical to the user ID 584. If this is the case, it is determined that the data-recording devices 401 and 402 are registered in the recording reservation broadcasting system 100. The reservation-broadcasting data generator 632 transmits the group recording reservation-broadcasting data 660 to the devices 401 and 402. The storage unit 620 may not store the user ID 652A identical to the user ID 584. In this case, it is determined that neither the device 401 and nor the device 402 is registered in the recording reservation broadcasting system 100. The unit 632 does not transmit the group recording reservation-broadcasting data 660 to the device 401 or the device 402.

Thus, the server device 600 transmits the group recording reservation-broadcasting data 660 to only the data-recording devices 401 and 402 that are registered in the recording reservation broadcasting system 100 and identified by the user ID 584. The data-recording devices 401 and 402 can therefore be selected for the recording reservation, in association with the persons who own these device 401 and 402. The group recording reservation can be set in, for example, the third data-recording device 402 only, whose owner has the same taste as the user of the first data-recording device 400. This enhances the control of the broadcasting.

The group recording reservation-broadcasting data 660 contains the destination device ID 661 that designates the second data-recording device 401 or the third data-recording device 402. Upon receiving the group recording reservation-broadcasting data 660, the received-data identifying unit 531 determines whether the destination device ID 661 is identical with the self-ID 512A recorded in the hard disk 510. If the destination device ID 661 and the self-ID 512A are identical, it is determined that the group recording reservation-broadcasting data 660 has been transmitted to the second data-recording device 401. The group recording reservation is then set in the recording unit 532. If the destination device ID 661 and the self-ID 512A are not identical, it is determined that the group recording reservation-broadcasting data 660 has not been transmitted to the second data-recording device 401. In this case, the group recording reservation is not set. Thus, the second data-recording device 401 sets the group recording reservation on the basis of the group recording reservation-broadcasting data 660 transmitted to the device 401. Nonetheless, it does not set the group recording reservation even if it receives the group recording reservation-broadcasting data 660 transmitted to, for example, the third data-recording device 402. Namely, the TV program recorded in accordance with the group recording reservation set for the second data-recording device 401, which agrees to the taste of the user of the device 401, can be recorded in the second data-recording device 401.

The group recording reservation notice 580 contains the group ID 583 that designates the group for which the group recording reservation should be made. In the server device 600, the storage unit 620 stores the group ID 642A, which designates the group registered in the recording reservation broadcasting system 100. In the server device 600, too, the reception-notice identifying unit 631 determines whether the storage unit 620 stores the group ID 642A identical to the group ID 583. Assume that the storage unit 620 stores the group ID 642A identical to the group ID 583. Then, it is determined that the group identified by the group ID 583 is registered in the recording reservation broadcasting system 100. The reservation-broadcasting data generator 632 transmits the group recording reservation-broadcasting data 660 to the data-recording devices 401 and 402 that belong to the group identified by the group ID 583. If the storage unit 620 is determined not to store the group ID 642A identical to the group ID 583, it is determined that the group identified by the group ID 583 is not registered in the recording reservation broadcasting system 100. In this case, the group recording reservation-broadcasting data 660 is not transmitted to the device 401 or the device 402.

Thus, the server device 600 transmits the group recording reservation-broadcasting data 660 to only the data-recording devices 401 and 402 that belong to the group registered in the recording reservation broadcasting system 100. Hence, one group ID, e.g., ID 583, contained in the group recording reservation notice 580 can designate a plurality of data-recording devices, such as devices 401 and 402, to which the group recording reservation-broadcasting data 660 should be transmitted. In order to set the group recording reservation in a plurality of data-recording devices, such as devices 401 and 402, the group recording reservation notice 580 needs contain, but one group ID, i.e., ID 583. This helps to reduce the amount of the group recording reservation notice 580.

The group recording reservation notice 580 contains the source device ID 581 that designates, for example, the first data-recording device 400 to which the group recording reservation notice 580 has been transmitted. In the server device 600, the reception-notice identifying unit 631 may determine that the storage unit 620 stores the group ID 642A identical to the group ID 583. If this is the case, the unit 631 determines whether the device identified by the source ID 581, e.g., the first data-recording device 400, belongs to the group designated by this group ID 583. If the device 400 is found to belong to the group, the reservation-broadcasting data generator 632 transmits the group recording reservation-broadcasting data 660. If the device 400 is found not to belong to the group, the unit 632 does not transmit the data 660.

Thus, the server device 600 transmits the group recording reservation-broadcasting data 660 in accordance with only the group recording reservation notice 580 supplied from, for example, the first data-recording device 400, if the data-recording devices 401 and 402 are designated as devices for which the group recording reservation should be made. Therefore, the first data-recording device 400, which belongs to the same group as the devices 401 and 402 and which is allowed to set the group recording reservation in the devices 401 and 402, sets the group recording reservation in the data-recording devices 401 and 402. The TV program recorded by the group recording reservation agrees to the taste of the users who own the data-recording devices 401 and 402. The reception-notice identifying unit 631 that achieves this advantage is incorporated in the server device 600. The data-recording devices 400, 401 and 402 do not need to have a unit equivalent to the unit 631 each. This serves to simply the data-recording devices 400, 401 and 402 in terms of structure.

The hard disk 510 of, for example, the second data-recording device 401 stores the group ID 512F that identifies the group to which the device 401 belongs. The group recording reservation-broadcasting data 660 contains the group ID 664 that designates the group for which the group recording reservation is to be made. When the second data-recording device 401, for example, receives the group recording reservation-broadcasting data 660, the received-data identifying unit 531 determines whether the group ID 664 is identical to the group ID 512F stored in the hard disk 510. If the group ID 664 is found identical to the group ID 512F, it is determined that the group recording reservation-broadcasting data 660 has been transmitted from a data-recording device of the same group as the device 401, for example, the first data-recording device 400. Then, the recording unit 532 sets the group recording reservation. If the group ID 664 is found not identical to the group ID 512F, the group recording reservation-broadcasting data 660 is found not to have been transmitted from a data-recording device of the same group as the device 401, for example the first data-recording device 400. In this case, the recording unit 532 does not set the group recording reservation.

Thus, the group recording reservation is set in the second data-recording device 401 by, for example, the first data-recording device 400 alone, which belongs to the same group as the second data-recording device 401 and which is allowed to set the group recording reservation in the device 401. The TV program recorded by unit of the group recording reservation can, therefore, agree to the taste of the user who owns the second data-recording device 401. Since the same TV program is recorded in another data-recording device belonging to the group, for example, the third data-recording device 402, the user of the device 401 can enjoy talking about the TV program with the user of the device 402.

In the second data-recording device 401 or the third data-recording device 402, it is determined whether the group recording reservation set by the first data-recording device 400 should be received or not. On the basis of the decision, the recording reservation confirming unit 534 generates group recording setting data, which is transmitted to the server device 600. The data-recording devices 401 and 402 have a reservation-condition data generator 633 each. The unit 633 generates group recording reservation-condition data from the group recording setting data transmitted from the data-recording device 401 or 402. The unit 633 transmits the reservation-condition data to, for example, the first data-recording device 400 that has set the group recording reservation. Further, the first data-recording device 400 is connected to the display unit 560 of, for example, the second data-recording device 401 that is described in the reservation-condition data. Hence, the user who owns the first data-recording device 400 that has set the group recording reservation can easily grasp whether the data-recording devices 401 and 402 of the same group have received the group recording reservation.

The reservation-condition data generator 633 performs the function of determining whether the group recording setting data has been received from the data-recording device 401 or 402 that has transmitted the group recording reservation-broadcasting data 660. If the unit 633 determines that the group recording setting data has not been received, the group recording reservation-broadcasting data 660 is transmitted again. The users of the devices 401 and 402 that have sent back no group recording reservation data can therefore recognize that it is necessary for them to sent back the data immediately. This enables the server device 600 to receive the group recording setting data quickly from the data-recording devices 401 and 402. Thus, the user of the first data-recording device 400 can faster grasp that the whether the data-recording devices 401 and 402 of the same group have received the group recording reservation.

The server device 600 has the server-timer unit 634. In the server device 600, the reservation-condition data generator 633 may determine that the group recording setting data containing the group recording reservation-broadcasting data 660 has not been transmitted from the data-recording device 401 or 402. If this is the case, the unit 633 acquires the present-time data from the server-timer unit 634. Then, the unit 633 detects the group recording start time from the recording reservation data 665 contained in the group recording reservation-broadcasting data 660. It is then determined whether the recording start time will come within a preset period of, for example, 30 minutes or more. If YES, the data-recording device that has not sent back the group recording reservation data, e.g., the third data-recording device 402, is made to transmit the group recording reservation-broadcasting data 660 again. If NO, the data-recording device is not made to transmit the group recording reservation-broadcasting data 660.

Until the time within which the recording start time will come becomes shorter than the preset period, the group recording reservation-broadcasting data 660 is repeatedly transmitted at given intervals to, for example, the third data-recording device 402. When the data 660 is transmitted for the second time, the user of the third data-recording device 402 may not be back at home. When the data 660 is transmitted for the third time, this user may be back at home. Then, the user can recognize that he or she should send back the group recording setting data. Thus, the server device 600 can receive the group recording setting data more reliably than otherwise, from the data-recording device 401 or 402 to which the group recording reservation-broadcasting data 660 has been transmitted. The user of the first data-recording device 400 can therefore know for sure that the data-recording device 401 or 402 has received the recording reservation.

As previously indicated, the server device 600 has the server-timer unit 634. Assume that the time the recording-device clock unit 535 detects in, for example, the first data-recording device 400 is, for example, one hour behind the time detected by the recording-device clock unit 535 of the data-recording device 401 or 402 and the time detected by the server-time unit 634 of the server device 600. Also assume that the server device 600 receives the group recording reservation notice 580 set for 21:30 when the time clocked by the server-time unit 634 is 22:00. Then, the group recording reservation data that has been set by the notice 580 is valid for the first data-recording device 400 since the time the recording-device clock unit 535 of the data-recording device 400 is 21:00. By contrast, the group recording reservation data is invalid for the data-recording devices 401 and 402 since the time the recording-device clock unit 535 of the data-recording devices 401 and 402 is 22:00. When the server device 600 receives the group recording reservation notice 580 in this condition, the reception-notice identifying unit 631 determines that the notice 580 is invalid. This is because the time the server-time unit 634 clocks in the reception-notice identifying unit 631 is well past the recording start time set in the group recording reservation notice 580. Therefore, the server device 600 does not set the group recording reservation in the data-recording device 401 or the data-recording device 402.

Thus, the server device 600 sets the group recording reservation on the basis of the time clocked by the server-time unit 634. Hence, it will not set the group recording reservation even if it receives the group recording reservation notice 580 from the first data-recording device 400, which is invalid because the recording-device clock unit 535 is not adjusted to clock correct time. That is, the server device 600 can set the group recording reservation on the basis of the time clocked by the sever-timer unit 634, or the so-called "standard time." The group recording reservation can be set on the basis of the correct time, even if the recording-device clock unit 535 is not adjusted in the data-recording device 400, 401 or 402. This ensures an appropriate process control.

The data-recording devices 400, 401 and 402 have an input unit 500 and a CPU 530 each. The input unit 500 generates a group recording reservation instruction 370. The user can easily set a group recording reservation, merely by operating the input unit 500.

The second data-recording device 401 incorporates the input unit 500. The input unit 500 outputs a predetermined signal when the user operates it in order to receive or not receive the group recording reservation set by, for example, the first data-recording device 400. The recording reservation confirming unit 534 of the second data-recording device 401 generates the group recording setting data and transmits this data to the server device 600, in accordance with the predetermined signal supplied from the input unit 500. The user of, for example, the second data-recording device 401 can therefore determine whether he or she should receive the group recording reservation set by, for example, the first data-recording device 400. Hence, the second data-recording device 401 can record a TV program that agrees to the taste of its user.

The network 200 connects the second data-recording device 401, for example, to the second terminal device 301. The second terminal device 301 has the transmitter/receiver 310, terminal input unit 320, terminal display unit 330 and processing unit 350. In the second terminal device 301, the transmitter/receiver 310 receives the reservation-receipt confirming data from the second data-recording device 401 via the network 200. The reservation-receipt confirming data prompts the user to operate the input unit 320 to receive or not receive the group recording reservation set by, for example, the first data-recording device 400. Then, the processing unit 350 makes the terminal display unit 330 display a menu, prompting the user to operate the unit 320. When operated, the input unit 320 generates a signal, which is transmitted to the second data-recording device 401 through the network 200. In the second data-recording device 401, the recording reservation confirming unit 534 receives the signal transmitted from the second terminal device 301. In accordance with the signal received, the unit 534 generates group recording setting data, which is transmitted to the server device 600.

Thus, the user of, for example, the second data-recording device 401 can use the second terminal device 301 to determine whether or not to receive the group recording reservation, at a place remote from the home. The second data-recording device 401 can therefore record any TV program agreeing to the user's taste, which has been reserved through the group recording reservation. In view of this, the recording reservation broadcasting system 100 is greatly versatile.

The recording reservation confirming unit 534 of the second data-recording device 401, for example, performs the function of acquiring the present-time data from the recording-device clock unit 535 after it has confirmed whether the group recording reservation should be received or not. The unit 534 performs another function. That is, it determines whether a signal has been received from the input unit 500 or the second terminal device 301, upon lapse of the preset period of, for example, 1 minute. If the unit 534 determines that the signal has not been received, it can then output the reservation-receipt confirmation data, demanding that the user should operate the input unit or terminal device to receive or not receive the group recording reservation.

Thus, the second data-recording device 401, for example, can prompt its user to operate immediately the input unit or terminal device to receive or not receive the group recording reservation. Therefore, the second data-recording device 401 can quickly receive the data showing whether the user will receive or will not receive the group recording reservation, and can quickly transmit this data to the server device 600. The server device 600 can transmit the group recording reservation-condition data at once to, for example, the first data-recording device 400. This enables the user of, for example, the first data-recording device 400 to know quickly and reliably whether the other data-recording devices of the same group, i.e., devices 401 and 402, have received or not received the group recording reservation.

The first terminal device 300 is connected to, for example, the first data-recording device 400 by the network 200. The first terminal device 300 has the function of generating a group recording reservation instruction 370 and transmitting the instruction 370 to the first data-recording device 400 through the network 200. The user of the first data-recording device 400 can therefore use the first terminal device 300 to set the group recording reservation, even at any place remote from the home. In other words, he or she can set the group recording reservation at any place he or she happens to be. Hence, the recording reservation broadcasting system 100 is greatly versatile.

The group recording reservation instruction 370, which is used to set the group recording reservation in the recording reservation broadcasting system 100, contains the self-ID 371, group ID 372, user ID 373 and recording reservation data 374. The self-ID 371 designates, for example, the first data-recording device 400 that instructs the group recording reservation. The group ID 372 designates the group to which the second and third data-recording devices 401 and 402 belong. The user ID 373 designates the second data-recording device 401 or the third data-recording device 402. The recording reservation data 374 is recording basic data. The instruction 370 is a minimum amount of data and can yet serve to set the group recording reservation.

[Modifications of the Embodiment]

The present invention is not limited to the embodiment described above. The invention includes the following modifications that can achieve the object of the invention.

In the embodiment, the group recording reservation is set on the basis of the group recording reservation instruction 370 generated in the first terminal device 300. Instead, the group recording reservation can be set in different ways, as will be described blow.

For example, a remote controller or the input unit 500 of the first data-recording device 400 may be operated, generating a group recording reservation instruction 370. The group recording reservation instruction 370 is output to the CPU 530 of the first data-recording device 400 so that the device 400 may set the group recording reservation. Then, the recording reservation broadcasting system 100 need not have the first terminal device 300. This simplifies the recording reservation broadcasting system 100.

In the recording reservation broadcasting system 100, the second data-recording device 401 and the third data-recording device 402, for which the group recording reservation is made, are designated by user IDs or a group ID. Nonetheless, they may be designated in accordance with a group ID only. In this case, the process of setting the group recording reservation is terminated if the self-ID 371 is found not to be identical to the self-ID 512A in the Step S102. If the self-ID 371 is found identical to the self-ID 512A in the Step S102, the process of the Step S107 is carried out. In the Step S107, the group for which the group recording reservation should be made may be found not to include the first data-recording device 400. Then, the process of setting the group recording reservation is terminated. If the group is found to include the first data-recording device 400, the process of the Step S105 is performed. Thus, the processes of the Steps S103, S104 and S108 can be dispensed with. This shortens the time required to set the group recording reservation in, for example, the first data-recording device 400.

In the Step S202, the group for which the group recording reservation set in accordance with the group recording reservation notice 580 may be found not registered in the server device 600. If this is the case, it is determined that the group recording reservation notice 580 is invalid. The process of setting the group recording reservation is therefore terminated. If the group is found to be registered in the server device 600, the process of the Step S207 will be performed. If it is determined in the Step S207 that the first data-recording device 400 that has transmitted the group recording reservation notice 580 does not belong to the group, the process of setting the group recording reservation is terminated. If the device 400 is found to belong to the group, the process of the Step S204 will be carried out. Hence, the processes of the Steps S203 and S208 can be skipped. This shortens the time required to set the group recording reservation in the server device 600.

The second data-recording device 401, for example, terminates the process of setting the group recording reservation if the destination device ID 661 and the self-ID 512A are found not identical in the Step S302. If the destination device ID 661 and the self-ID 512A are found identical, the device 401 will perform the process of the Step S306. The process of the Step S303 can be dispensed with. Thus, it is possible to shorten the time required to set the group recording reservation in, for example, the second data-recording device 401.

Further, it is not necessary to store the registered-user number data 364 or the registered-user data 365 in the memory 340 of the first terminal device 300. Nor is it necessary to store the registered-user number data 512D or the registered-user data 512E in the hard disk 510 of the first data-recording device 400. Nor is it necessary to store the user list 650 in the storage unit 620 of the server device 600. The storage capacities of the memory 340 of the first terminal device 300, hard disk 510 of the first data-recording device 400 and storage unit 620 of the server device 600 can, therefore, be reduced.

It is not necessary to set the user ID 373 in the group recording reservation instruction 370. Nor is it necessary to set the user ID 584 in the group recording reservation notice 580. This makes it possible to decrease the amount of data contained in the group recording reservation instruction 370 and the amount of data contained in the group recording reservation notice 580. As a result, both the group recording reservation instruction 370 and the group recording reservation notice 580 can be transmitted and received within a short time.

The second data-recording device 401 and the third data-recording device 402, for which the group recording reservation is to be made, may be set for the persons who own them. In this case, the first data-recording device 400 terminates the process of setting the group recording reservation if the self-ID 371 and the self-ID 512A are not found identical in the Step S102. If the self-ID 371 and the self-ID 512A are found identical, the process of the Step S108 is carried out. If it is determined in the Step S108 that the group recording reservation instruction 370 does not contain the user ID 373, the first data-recording device 400 terminates the process of setting the group recording reservation. If the group recording reservation instruction 370 is found to contain the user ID 373, the process of the Step S105 is performed. The processes of the Steps S103, S104 and S107 can therefore be skipped. This can shorten the time required to set the group recording reservation in, for example, the first data-recording device 400 that instructs the group recording reservation.

In the Step S202, it may be determined that the user for whom the group recording reservation should be made and who is identified by the group recording reservation notice 580 is not registered in the server device 600. If this is the case, the group recording reservation notice 580 is regarded as invalid, and the process of setting the group recording reservation is terminated. On the other hand, if this person is found registered in the server device 600, the process of the Step S208 is carried out. In the Step S208, the person may be found not registered in the server device 600. Then, the process of setting the group recording reservation is terminated. If the person is found to be registered in the server device 600, the process of the Step S204 is performed. Thus, the processes of the Steps S203 and S207 can be dispensed with. This shortens the time required to set the group recording reservation in the server device 600.

In the Step S302, the second data-recording device 401, for example, may determine that the destination device ID 661 and the self-ID 512A are found not identical. In this case, the process of setting the group recording reservation is terminated. If the destination device ID 661 and the self-ID 512A are found identical, the process of the Step S304 is carried out. The processes of the Steps S303 and S306 can therefore be skipped. Hence, it is possible to shorten the time required to set the group recording reservation in, for example, the second data-recording device 401 for which the group recording reservation has been instructed.

Thus, it is unnecessary to store the group-number data 362 or the group data 363 in the memory 340 of the first terminal device 300. Nor is it necessary to store the group-number data 512B or the group data 512C in the hard disk 510 of the first data-recording device 400. Further, it is unnecessary to store the group list 640 in the storage unit 620 of the server device 600. This helps to reduce the storage capacities of the memory 340 of the first terminal device 300, hard disk 510 of the first data-recording device 400 and storage unit 620 of the server device 600.

This also makes it unnecessary to set the group ID 372 in the group recording reservation instruction 370. Nor is it necessary for the group recording reservation notice 580 to contain the group ID 538. It is not necessary, either, to set the group ID 664 in the group recording reservation-broadcasting data 660. This decreases the amount of data contained in the group recording reservation instruction 370, the amount of data contained in the group recording reservation notice 580 and the amount of data contained in the group recording reservation-broadcasting data 660. As a result, these data items can be transmitted and received within a short time.

As described above, the self-ID 371, source ID 581 and source device ID 662 are contained in the group recording reservation instruction 370, group recording reservation notice 580 and group recording reservation-broadcasting data 660, respectively. Nonetheless, these data items may not be contained in the instruction 370, notice 580 and data 660. In this case, the first data-recording device 400 performs the process of the Step S103 after it receives the group recording reservation instruction 370 in the Step S101. The process of the Step S102 can therefore be skipped. This servers to shorten the time for setting the group recording reservation in, for example, the first data-recording device 400.

If it is determined in the Step S203 that the group for which the group recording reservation should be made are registered in the server device 600, the server device 600 performs the process of the Step S208. The process of the Step S207 can therefore be skipped. This shortens the time for setting the group recording reservation in the server device 600.

Moreover, the amount of data contained in the group recording reservation instruction 370, group recording reservation notice 580 and group recording reservation-broadcasting data 660 can be reduced. These data items can therefore be transmitted and received within a short time.

As mentioned earlier, the group recording reservation notice 580 contains the recording reservation ID 582, and the group recording reservation-broadcasting data 660 contains the recording reservation ID 663. Nevertheless, they may not contain the ID 582 and the ID 663, respectively. Then, the group recording reservation notice 580 and the recording reservation-broadcasting data 660 can be reduced in amount and can be transmitted and received within a shorter time than otherwise.

The reservation data 514BNr for each of the data-recording device 400, 401 and 402 need not contain the recording reservation ID 514C. This can decrease the storage capacity required of the hard disk 510.

As indicated above, the received-data identifying unit 531 of the first data-recording device 400 performs the function of determining the validity of the group recording reservation instruction 370. Nonetheless, the unit 531 may not have this function. If this is the case, the first data-recording device 400 performs the process of the Step S106, generating reservation data 514BNr from the group recording reservation instruction 370 that it has received in the Step S101. The processes of the Steps S102 to S105 and the processes of the Steps S107 and S108 can be dispensed with. The first data-recording device 400, for example, which instructs the group recording reservation, can then set the group recording reservation within a shorter time than otherwise.

The received-data identifying unit 531 of, for example, the second data-recording device 401 performs the function of determining the validity of the group recording reservation-broadcasting data 660. The unit 531 may not have this function, nevertheless. In this case, the second data-recording device 401 performs the process of the Step S305, confirming whether the group recording reservation should be received or not, after it has received in the Step S301 the group recording reservation-broadcasting data 660. The processes of the Steps S302 to S304 and the process of the Step 306 can be dispensed with. The second data-recording device 401, for example, which is instructed to perform the group recording reservation, can therefore set the group recording reservation within a shorter time than otherwise.

As described above, the data-recording devices 400, 401 and 402 have a hard disk 510 each, which records TV programs. The hard disk 510 may be replaced by a removable recording medium, such as a DVD or video tape, which can store TV programs. If recorded in such a removable recording medium, the TV programs can be preserved almost perpetually. This renders the recording reservation broadcasting system 100 very versatile.

As indicated already, the group recording reservation data is transmitted from, for example, the first data-recording device 400 to, for example, the data-recording devices 401 and 402 through the network 200 and the server device 600. Instead, the group recording reservation may be set by connecting the data-recording devices 400, 401 and 402 to the server device 600 by, for example, a LAN cable. In this case, the group recording reservation data need not be transmitted through the network 200. It does not take so much time to set the group recording reservation as through the network 200 due to data-traffic jam on the network 200, which has nothing to do with the data-recording devices 400, 401 and 402. Thus, the group recording reservation can always be set very quickly in the recording reservation broadcasting system 100.

The network 200 may connect the data-recording devices 400, 401 and 402, thereby to accomplish the group recording reservation. If so, the group recording reservation data need not be transmitted through the server device 600. Thus, the group recording reservation can be successfully set even if the maintenance of the server device 600 is not appropriately achieved, though the data-recording devices 400, 401 and 402 works well. The group recording reservation can always be set in the recording reservation broadcasting system 100. Without the server device 600, the recording reservation broadcasting system can have a simple configuration.

Further, the first data-recording device 400, for example, may be connected to the data-recording devices 401 and 402 by, for example, a LAN cable, to set the group recording reservation. If the system is so configured, it will be possible to set the group recording reservation without using the network 200 or the server device 600. Then, it does not take so much time to set the group recording reservation as is performed through the network 200 and the server device 600 due to data-traffic jam on the network 200 or the maintenance failure, if any, of the server device 600, which has nothing to do with the data-recording devices 400, 401 and 402. As result, the group recording reservation can always be set within a short time in the recording reservation broadcasting system 100. Hereinafter, a recording reservation broadcasting system that does not have server device 600 will be referred to as "simple recording reservation broadcasting system."

The simple recording reservation broadcasting system may be configured as will be described below. That is, the CPU 530 of, for example, the first data-recording device 400 incorporates a reservation-broadcasting data generator 632 and a reservation-condition data generator 633. These units 632 and 633 are of identical to those provided in the CPU 630 of the server device 600. The reservation-broadcasting data generator 632 generates group recording reservation broadcasting data 660 from the group recording reservation instruction 370 received and transmits the data 660 to, for example, the data-recording devices 401 and 402. The reservation-condition data generator 633 determines whether the group recording setting data has arrived from the data-recording devices 401 and 402 that have received the group recording reservation broadcasting data 660, within a period preset in the recording-device clock unit 535. The unit 633 can transmit the data 660 again to any data-recording device, i.e., the device 401 or 402, which has not sent back the group recording setting data, if the group recording setting data is found not have arrived from the device 401 or 402 within the preset period.

The group recording reservation broadcasting data 660 is thus transmitted again to any data-recording device that has not sent back the group recording setting data, e.g., the device 401 or the device 402. Therefore, the users of the device 401 or 402 can find it necessary to send back the group recording setting data at once. This enables the first data-recording device 400 to receive the group recording setting data from the data-recording device 401 or 402 within a short time. The user of the device 400 can immediately know whether the device 401 or 402 has received the group recording reservation data.

Furthermore, the reservation-condition data generator 633 of, for example, the first data-recording device 400 may be configured to perform the following process when it is determined that the group recording setting data has not arrived from the data-recording device 401 or 402 to which the group recording reservation broadcasting data 660 has been transmitted. In this case, the unit 633 acquires the present-time data from the recording-device clock unit 535 if the group recording setting data is determined not to have arrived from the data-recording device 401 or 402. Then, the unit 633 detects the recording start time from the recording reservation data 665 that is contained in the group recording reservation broadcasting data 660. The unit 633 then determines whether the recording start time will come within a preset period of, for example, 30 minutes or more. If YES, the data-recording device that has not sent back the group recording setting data, e.g., the third data-recording device 402, is made to transmit the group recording reservation-broadcasting data 660 again. If NO, the data-recording device is not made to transmit the group recording reservation-broadcasting data 660.

Thus, the group recording reservation-broadcasting data 660 is repeatedly transmitted at given intervals to, for example, the third data-recording device 402 until the time within which the recording start time will come becomes shorter than the preset period. Assume that the data 660 has been transmitted twice and that the user of the third data-recording device 402 has not been back at home yet. If the user is back at home at the time the data 660 is transmitted for the third time, he or she can recognize that he or she should send back the group recording reservation data. The first data-recording device 400 can therefore receive the group recording setting data more reliably than otherwise, from the data-recording device 401 or 402 to which the group recording reservation-broadcasting data 660 has been transmitted. The user of the first data-recording device 400 can then know for sure that the data-recording device 401 or 402 has received the group recording reservation.

As indicated above, the server device 600 incorporates the reception-notice identifying unit 631 that determines whether the notice 580 is valid or not. The reception-notice identifying unit 631 may not be provided in the server device 600, nonetheless. Without the unit 631, the server device 600 performs the process of the Step S205 after it receives the group recording reservation notice 580 in the Step S201. Namely, it generates the group recording reservation-broadcasting data 660 on the basis of the group recording reservation notice 580. Thus, the processes of the Steps S202 to S204 and the processes of the Steps S207 and S208 can be skipped. Hence, the time for setting the group recording reservation in the server device 600 can be shortened.

The reservation-condition data generator 633 may not be provided in the server device 600. In this case, the server device 600 terminates the process of setting the group recording reservation after it transmits the group recording reservation-broadcasting data 660 in the Step S206. The processes of the Steps S209 to S213 need not be carried out. The time for setting the group recording reservation can therefore be shortened in the server device 600.

The second data-recording device 401 terminates the process of setting the group recording reservation if the recording reservation data 665 is found invalid in the Step S304. If the data 665 is found valid, the device 401 performs the processes of the Steps S313 and S314 and then terminates the process of setting the group recording reservation. Hence, the processes of the Steps S305, S307 to S312 can be skipped, too. As a result, the time for setting the group recording reservation can be shortened in, for example, the second data-recording device 401 which has been instructed to perform the group recording reservation.

It is therefore unnecessary to provide the sever-timer unit 634 in the server device 600. Nor is it necessary to incorporate the recording reservation confirming unit 534 in the second data-recording device 401. Both the server device 600 and the second data-recording device 401 can be rendered simple in structure.

As described previously, the reservation-condition data generator 633 has the function of transmitting the group recording reservation-broadcasting data 660 again to, for example, the third data-recording device 402 that has not sent back the group recording setting data back. The unit 633 may not perform this function, nonetheless. If this is the case, the server device 600 receives the group recording setting data from the data-recording devices 401 and 402 after it has transmitted the group recording reservation-broadcasting data 660 to the data-recording devices 401 and 402. Then, the server device 600 terminates the process of setting the group recording reservation after it performs the processes of the Steps S210, even if it has not received the group recording setting data from the data-recording devices 401 and 402 that have received the group recording reservation-broadcasting data 660. Thus, the processes of the Steps S209, S212, S211 and S213 can be dispensed with. This shortens the time that the server device 600 requires to set the group recording reservation.

In the server device 600, the reservation-condition data generator 633 has the function of transmitting the group recording reservation-condition data to the first data-recording device 400. The unit 633 may not have this function. In this case, the reservation-condition data that the unit 633 has generated in the Step S210 is stored into, for example, the hard disk 510, and the server device 600 terminates the process of setting the group recording reservation. Thus, the process of the Step S211 need not be carried out. Hence, it is possible to shorten the time for setting the group recording reservation. In this configuration, the user of the first data-recording device 400 can recognize the condition of group recording reservation by, for example, reading the group recording reservation-condition data stored in the hard disk 510 of the server device 600 and transmitted to the first terminal device 300 or the fist data-recording device 400 through the network 200.

The recording reservation confirming unit 534 of, for example, the second data-recording device 401 have the function of transmitting the reservation-receipt confirmation data to the second terminal device 301. The unit 534 may not have this function. In this case, the second data-recording device 401 determines in the Step S305 whether it should receive the group recording reservation. Upon lapse of a predetermined time of, for example, 1 minute, the device 401 performs the process of the Step S310 even if it has not yet be determined whether the group recording reservation should be received or not. Thereafter, the processes of the Steps S311 to S314 are carried out, and the process of setting the group recording reservation is terminated. The processes of the Steps S308 and S309 can therefore be skipped. This shortens the time for setting the group recording reservation in, for example, the second data-recording device 401 that is instructed to perform the group recording reservation. In addition, the recording reservation broadcasting system 100 need not have the second terminal device 301 and can therefore be more simple in structure than otherwise.

The recording reservation confirming unit 534 of, for example, the second data-recording device 401 performs the function of causing the display unit 560 to display a message that prompts the user to input data showing whether he or she wants to receive the group recording reservation. Nonetheless, the unit 534 may not have this function. In this case, the unit 534 does not perform the process of the Step S305 if it determines in the Step S304 that the group recording reservation-broadcasting data 660 is valid. Then, the unit 534 performs the processes of the Steps S308 and S309, transmitting the reservation-receipt confirmation data to the second terminal device 301. After performing the processes of the Steps S309, the second data-recording device 401 carries out the processes of the Steps S307 to S314 and then terminates the process of setting group recording reservation. Therefore, the process of the Step S305 can be skipped. This shortens the time for setting the group recording reservation in, for example, the second data-recording device 401 that has been instructed to perform the group recording reservation.

The input unit 500 of, for example, the first data-recording device 400 is composed of various operation buttons that are arranged on the front of the first data-recording device 400. The buttons may be replaced by terminals (not shown) provided on the first data-recording device 400 and connected to an input unit (not shown) such as a keyboard. In this case, the first data-recording device 400 is connected by a cable (not shown) to the keyboard. The user of the device 400 may operate the keyboard, inputting data to set the group recording reservation at a position remote from the device 400.

As described above, the display unit 560 displays a menu prompting the user to determine in the Step S305 whether the group recording reservation should be received or not. Nonetheless, The menu may be displayed by any other unit, as will be described below.

That is, the second data-recording device 401, for example, has a recording-device display unit on its front. The display may be a liquid crystal display or a display comprising organic EL elements and displays the above-mentioned menu. In this case, the display unit 560 need not be connected to the second data-recording device 401. Therefore, the second data-recording device 401 can be smaller and can be provided on the device 401 with simpler wiring work.

As indicated earlier, the process of the Step S305 is performed if the recording reservation data 665 is found valid in the Step S304, thus confirming whether the group recording reservation should be received or not. This step of confirming whether the group recording reservation should be received may not be carried out. In this case, the process of setting the group recording reservation is terminated if the recording reservation data 665 is found invalid in the Step S304. Conversely, the process of the Step S313 is performed if the recording reservation data 665 is found valid. Hence, the process of the Steps S305 and the processes of the Steps S307 to S310 can be skipped. This shortens the time for setting the group recording reservation in the second data-recording device 401.

As has been described, if it is determined in the Step S307 that the group recording reservation data can be received, the process of the Step S310 is performed to determine whether this data shows that the group recording reservation should be received. This procedure may be replaced by the following one.

That is, in the second data-recording device 401, the recording reservation confirming unit 534 repeats the processes of the Steps S307 to S309, a predetermined number of times or for a predetermined period of time. If the unit 534 cannot determine whether the group recording reservation should be received or not, it determines whether the reservation should be received, on the basis of conditions preset. Thus, the recording reservation confirming unit 534 determines whether the device 401 should receive the group recording reservation, even if the user of the device 401 has gone out of home without taking the second terminal device 301 with him or her. If the group recording reservation should be received, the unit 534 generates group recording setting data. This data is transmitted to the server device 600. Therefore, the first data-recording device 400, which instructs the group recording reservation, can determine whether the second data-recording device 401 will receive the group recording reservation within a preset period.

As indicated above, the reservation-receipt confirmation data is transmitted in the Step S309 in the form of an E-mail, directly to the second terminal device 301. Instead, the reservation-receipt confirmation data may be transmitted to the server device 600, together with the source device ID 662 contained in the group recording reservation-broadcasting data 660. In this case, the mail address 652C that corresponds to the source device ID 662 is retrieved in the server device 600, thereby to transmit the reservation-receipt confirmation data from the server device 600 to the second terminal device 301 in the form of an E-mail. This makes it unnecessary to store the mail address 513A in the hard disk 510 of the second data-recording device 401. The storage capacity of the hard disk 510 can be reduced, which helps to render the device 401 smaller and lighter.

In the embodiment of the invention, the process designated by the request data is limited to the reservation of recording. Nonetheless, this process may include the recording.

The process designated by the request data is limited to the reservation of data recording in the above-described embodiment. Nonetheless, the process may include the playback of recorded TV programs, the playback of recorded music, and the execution of specific programs.

The recording reservation broadcasting system 100 described above has the data-recording devices 400, 401 and 402 that incorporate a hard disk recorder, which can record TV programs. Nonetheless, the invention can be applied to an audio recording broadcasting system that has stereophonic recorders, which are used as data-recording devices 400, 401 and 402 to record radio programs.

Moreover, the present invention can be applied to a content-recording broadcasting system that has computers, which are used as data-recording devices 400, 401 and 402 to record contents distributed through, for example, the network 200.

The recording reservation broadcasting system 100 described above includes the terminal devices 300, 301, the data-recording devices 400, 401 and 402 and the server device 600, and the network 200 that connects the devices 300, 301, 400, 401, 402 and 600. The present invention is not limited to the system 100, nevertheless. The present invention can be applied to a system that has a computer used as a unit for performing operations, to programs that causes the computer to perform the operations, and a recording medium that stores the programs. The same holds true for the data-recording devices 400, 401 and 402 that function as data-processing devices. The computer that works as an operation unit is not limited to a personal computer. It may include a plurality of computers that are connected, forming a network, a plurality of elements such as microcomputers, or a circuit board having many electronic components.

The embodiment of the present invention can be changed or modified in configuration and operation sequence in various manners to achieve the object of the present invention, without departing from the scope and spirit of the present invention.

[Advantages of the Embodiment]

In the embodiment described above, the first data-recording device 400 of the recording reservation broadcasting system 100 receives, at the network interface 490, the group recording reservation instruction 370 containing the recording reservation data 374. On the basis of the recording reservation data 374 contained in the instruction 370 thus received, the recording unit 532 sets the recording reservation. Thereafter, the recording reservation notifying unit 533 provided in the first data-recording device 400 transmits data similar to the recording reservation data 374, to the other data-recording devices 401 and 402. This enables the devices 401 and 402 to record the same data as the first data-recording device 400 does. Once the recording of a TV program has been reserved in the first data-recording device 400, a friend of the user of the device 400, who has, for example, the second data-recording device 401, can enjoy the TV program even if he or she has gone outside home without reserving the recording of that TV program.

What is claimed is:

1. A data-processing system comprising:
a plurality of data-processing devices that processes information based on request data each of the plurality of data-processing devices comprising: an instruction-acquiring unit which acquires process instruction data that contains the request data; a process control unit which processes the data in accordance with the request data contained in the process instruction data acquired by the instruction-acquiring unit; and a data-distributing unit which distributes the request data corresponding to the processing of the process control unit to another one of the plurality of data-processing devices to process the data; and
a server device comprising a request-acquiring unit connected to the data-processing devices by a network and configured to acquire the request data distributed from any one of the data-processing devices through the network, and a broadcasting unit configured to distribute the request data acquired by the request-acquiring unit, to any other data-processing devices,
wherein each of the plurality of data-processing devices comprises an instruction generator configured to generate the process instruction and outputs the process instruction to the request-acquiring unit of the another one of the data-processing devices,
wherein the instruction-acquiring unit acquires the request data distributed from the server device,
wherein the data-distributing unit causes the request-acquiring unit to acquire the request data,
wherein each of the data-processing devices comprises a broadcasting-notice generator configured to generate a broadcasting-notice data which demands that the request data be distributed to any other data-processing devices,
wherein the data-distribution control unit causes the data-distributing unit to distribute the broadcasting-notice data generated by the broadcasting-notice generator, to the server device,
wherein the request-acquiring unit acquires the broadcasting-notice data from any data-processing device, and
wherein the broadcasting unit distributes the request data in accordance with the broadcasting-notice data acquired by the request-acquiring unit.

2. The data-processing system according to claim 1, wherein the server device comprises a broadcasting control unit configured to determine whether the request data should be distributed to the broadcasting unit, in accordance with the broadcasting-notice data.

3. The data-processing system according to claim 2,
wherein the broadcasting-notice data contains broadcasting-destination data designating any other data-processing device,
wherein the server device comprises a sever storage unit configured to store registered-device data designating any data-processing devices registered in the server device, and
wherein the broadcasting control unit determines whether the server storage unit stores the registered-device data identical to the broadcasting-destination data and causes the broadcasting unit to distribute the request data in accordance with the broadcasting-destination data when the server storage unit stores the registered-device data identical to the broadcasting-destination data and not to distribute the request data when the server storage unit stores registered-device data not identical to the broadcasting-destination data.

4. The data-processing system according to claim 3,
wherein each of the data-processing device comprises a processing-device storage unit which stores self-ID data specific to the data-processing device,
wherein the instruction-acquiring unit acquires the destination-device data distributed from the server device and representing the device which is to process the data;
wherein the process control unit determines whether the destination-device data acquired by the instruction-acquiring unit is identical to the self-ID data, processes the data when the destination-device data is identical to the self-ID data, and does not process the data when the destination-device data is not identical to the self-ID data, and
wherein the broadcasting control unit distributes the destination-device data to the broadcasting unit, together with the request data.

5. The data-processing system according to claim 2,
wherein the broadcasting-notice data contains broadcasting-destination group data which designates a group of data-processing devices,
wherein the server device has a server storage unit which stores registered-group data designating the group registered, and
wherein the broadcasting control unit determines whether the server storage unit stores the registered group data that is identical to the broadcasting-destination group data, and causes the broadcasting unit to distribute the request data in accordance with the broadcasting-destination group data when the server storage unit stores registered group data identical to the broadcasting-destination data and not to distribute the request data when the server storage unit stores registered group data not identical to the broadcasting-destination data.

6. The data-processing system according to claim 5,
wherein the broadcasting-notice data contains source data which designates the data-processing device which has distributed the broadcasting-notice data, and
wherein the broadcasting control unit determines whether the data-processing device designated by the source data belongs to the same group as the registered group designated by the registered group data, and causes the broadcasting unit to distribute the request data when the data-processing device belongs to the same group and not to distribute the request data when the data-processing device does not belong to the same group.

7. The data-processing system according to claim 5,
wherein each of the data-processing devices comprises a processing-device storage unit which stores group data designating the group to which the data-processing device belongs,
wherein the instruction-acquiring unit acquires destination group data distributed from the server device and designating a plurality of data-processing devices which process the data,
wherein the process control unit determines whether the processing-device storage unit stores the group data identical to the destination group data acquired by the instruction-acquiring unit, and process the data when the processing-device storage unit stores the group data and does not process the data when the processing-device storage unit does not store the group data, and wherein the broadcasting control unit distributes the destination group data to the broadcasting unit, together with the request data.

8. The data-processing system according to claim 1,
wherein the request data contains scheduled time data representing the time at which the processing of the data should be started,
wherein the server device comprises a server clock unit which clocks the present time, and
wherein the broadcasting control unit acquires present-time data from the server clock unit, determines a period until the time represented by the scheduled time data, and causes the broadcasting unit to distribute the request data when the period is equal to or longer than a preset value and not to distribute the request data when the period is shorter than the preset value.

9. The data-processing system according to claim 1,
wherein each of the data-processing devices comprises a request-receipt confirming unit which determines whether the process control unit should process the data and which generates process-setting data and transmits the process-setting data to the server device, and a process-device notifying unit which acquires the process-setting data from the server device and generates a process-device notice showing whether the data-processing device that has generated the process-setting data should process the data, and
wherein the server device comprises a setting-data distributing unit which receives the process-setting data from the data-processing device and outputs the process-setting data to the data-processing device which has distributed the broadcasting-notice data.

10. The data-processing system according to claim 1, wherein the broadcasting control unit determines whether the setting-data distributing unit has acquired the process-setting data from the data-processing device that has distributed the request data, and causes the broadcasting unit not to distribute the request data again when the setting-data distributing unit is found to acquire the process-setting data and to distribute the request data again when the setting-data distributing unit is found not to acquire the process-setting data.

11. A data-processing system comprising:
a plurality of data-processing devices that process information based on request data, that each of the plurality of data-processing devices comprising:
an instruction-acquiring unit which acquires process instruction data that contains the request data;
a process control unit which processes the data in accordance with the request data contained in the process instruction data acquired by the instruction-acquiring unit; and
a data-distributing unit which distributes the request data corresponding to the processing of the process control unit to another one of the plurality of data-processing devices to process the data, the plurality of data-processing devices being connected by a network to transmit and receive various data items,
wherein each of the plurality of data-processing devices comprises an instruction generator which generates the process instruction and outputs the process instruction to the instruction-acquiring unit of the another one of the data-processing devices,
wherein each of the data-processing devices comprises:
a request-receipt confirming unit which determines whether the process control unit should process the data, generates process-setting data on the basis of the decision and distributes the process-setting data to any other data-processing device that has distributed the request data;
a data-acquiring unit which acquires the process-setting data input; and
a process-device notifying unit which notifies whether the data-processing device that has generated the process-setting data should process the data, from the process-setting data acquired by the data-acquiring unit.

12. The data-processing system according to claim 11,
wherein each of the data-processing devices comprises a processing-device storage unit which stores a self-ID data specific to the data-processing device, and a data-distribution control unit which causes the data-distributing unit to distribute destination-device data designating the device that should process the data, together with the request data
wherein the instruction-acquiring unit acquires the request data and the destination-device data, and
wherein the process control unit determines whether the destination-device data is identical to the self-ID data, processes the data when the destination-device data is identical to the self-ID data and does not process data when the destination-device data is not identical to the self-ID data.

13. The data-processing system according to claim 11,
wherein each of the data-processing device comprises a processing-device storage unit which stores group data designating a group to which the data-processing device belongs, and a data-distribution control unit which causes the data-distributing unit to distribute destination group data designating a plurality of data-processing devices that should process the data, together with the request data,
wherein the instruction-acquiring unit acquires the request data and the destination group data, and
wherein the process control unit determines whether the processing-device storage unit stores the group data identical to the destination group data, processes the data when the processing-device storage unit stores that group data, and does not process the data when the processing-device storage unit does not store that group data.

14. The data-processing system according to claim 11,
wherein the request data contains scheduled time data representing the time at which the processing of the data should be started; and
wherein each of the data-processing devices comprises: a processing-device clock unit which clocks the present time; and a data-distribution control unit which acquires present-time data from the processing-device clock unit, determines a period until the time represented by the scheduled time data, and causes the data-distributing unit to distribute the request data when the period is equal to or longer than a preset value and not to distribute the request data when the period is shorter than the preset value.

15. The data-processing system according to claim 11, wherein each of the data-processing devices comprises a distribution control unit which determines whether the data-acquiring unit has acquired the process-setting data from any other data-processing device that has distributed the request data and which causes the data-distributing unit not to distribute the request data again when the data-acquiring unit has acquired the process-setting data and to distribute the request data again when the data-acquiring unit has not acquired the process-setting data.

16. A data-processing system according to claim 9,
wherein each of the data-processing devices comprises a signal output unit which outputs a prescribed signal showing whether the process control unit should process the data, and
wherein the request-receipt confirming unit determines whether the process control unit should process the data, in accordance with the prescribed signal supplied from the signal output unit.

17. The data-processing system according to claim 9, further comprising a terminal device which is connected to the data-processing devices by the network to transmit and receive various data items, the terminal device comprising a terminal-signal output unit which outputs a prescribed signal to the process control unit in accordance with whether the data should be processed, a terminal-setting data acquiring unit which acquires a setting-request data requesting that the prescribed signal be output, from the data-processing device, and a terminal-notifying unit which requests that the prescribed signal be output, in accordance with the setting-request data acquired by the terminal-setting data acquiring unit,
wherein the each of the data-processing device comprises a setting-request generator which generates the setting-request data and outputs the setting-request data to the terminal device, and
wherein the request-receipt confirming unit acquires the prescribed signal from the terminal device and determines whether the process control unit should process the data, in accordance with the prescribed signal.

18. The data-processing system according to claim 17,
wherein each of the data-processing devices comprises a processing-device clock unit which clocks the present time, and
wherein the request-receipt confirming unit determines whether the prescribed signal has been received from at least one of the signal output unit and the terminal device and causes the setting-request generator not to generate the setting-request data when the prescribed signal has found to have been received, and to generate the setting-request data when the prescribed signal has not found to have been received.

19. The data-processing system according to claim 1, further comprising a process-instruction generating device which is connected to the data-processing devices by the network and which is configured to generate the process instruction and output the process instruction to the data-processing devices through the network.

\* \* \* \* \*